(12) United States Patent
Nishihara et al.

(10) Patent No.: US 7,990,903 B2
(45) Date of Patent: Aug. 2, 2011

(54) COMMUNICATION TERMINAL DEVICE, COMMUNICATION SYSTEM, COMMUNICATION METHOD, AND PROGRAM

(75) Inventors: Jun Nishihara, Kanagawa (JP); Takuya Kato, Tokyo (JP)

(73) Assignees: Sony Corporation, Tokyo (JP); Sony Computer Entertainment, Inc., Tokyo (JP)

( * ) Notice: Subject to any disclaimer, the term of this patent is extended or adjusted under 35 U.S.C. 154(b) by 1462 days.

(21) Appl. No.: 11/370,257

(22) Filed: Mar. 7, 2006

(65) Prior Publication Data

US 2006/0242025 A1 Oct. 26, 2006

(30) Foreign Application Priority Data

Mar. 7, 2005 (JP) ................................. 2005-062537

(51) Int. Cl.
*H04H 20/71* (2008.01)
(52) U.S. Cl. ........................................................ 370/312
(58) Field of Classification Search .................. None
See application file for complete search history.

(56) References Cited

U.S. PATENT DOCUMENTS

| 7,039,433 | B2 * | 5/2006 | Rantalainen et al. ......... 455/502 |
| 2003/0140296 | A1 | 7/2003 | Odman | |
| 2003/0179779 | A1 * | 9/2003 | Kim ............................... 370/503 |
| 2004/0139159 | A1 | 7/2004 | Ricciardi et al. | |
| 2004/0252637 | A1 | 12/2004 | Laberteaux | |

FOREIGN PATENT DOCUMENTS

| EP | 1 487 155 | 12/2004 |
|---|---|---|
| JP | 2000-138685 | 5/2000 |
| JP | 2001-136177 | 5/2001 |
| JP | 2005-6327 | 1/2005 |
| JP | 2005-20162 | 1/2005 |

OTHER PUBLICATIONS

Notification of Reason(s) for Refusal dated Jan. 6, 2009, from the corresponding Japanese Application.

\* cited by examiner

*Primary Examiner* — Chi H Pham
*Assistant Examiner* — Fan Ng
(74) *Attorney, Agent, or Firm* — Katten Muchin Rosenman LLP

(57) ABSTRACT

A communication terminal device, a communication system, a communication method, and a program which can realize the functions of joining and exiting from a network in the middle of communication, detecting disappearance of stations (communication terminals), and/or changing over a coordinator function. The communication terminal has the capabilities of: detecting disappearance of a coordinator in the network by lack of reception of beacons and frames from other terminals, and, if its transmission timing at a certain TBTT is the shortest within a network, serving as a new coordinator itself to transmit beacons; and serving as a communication-holding coordinator having entered a predetermined mode, and transmitting a change request frame to a communication terminal to which changeover of a coordinator function is requested, thereby transferring the coordinator function to a communication terminal not functioning as the coordinator.

18 Claims, 16 Drawing Sheets

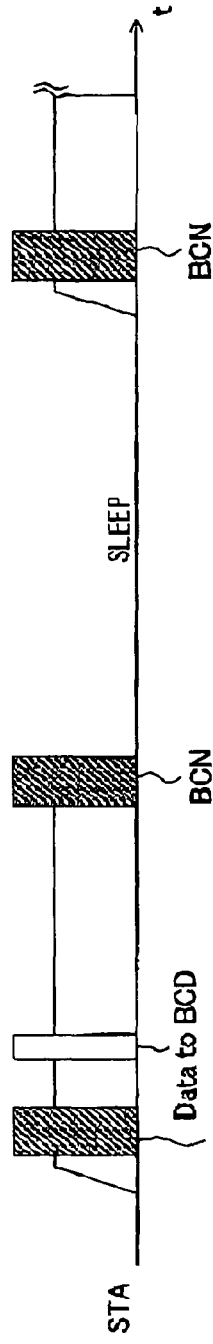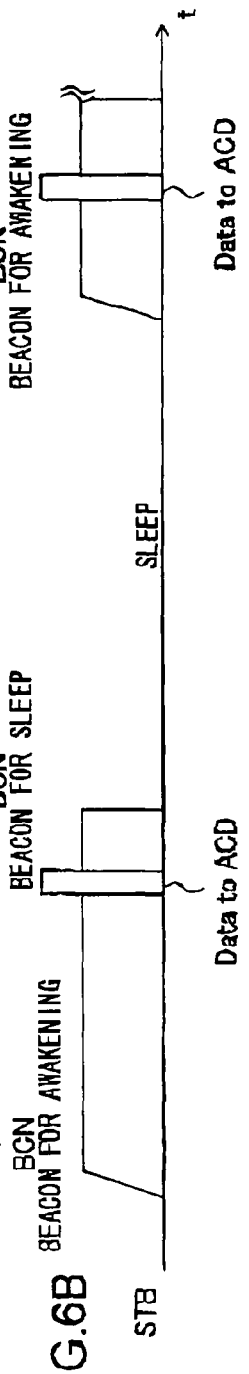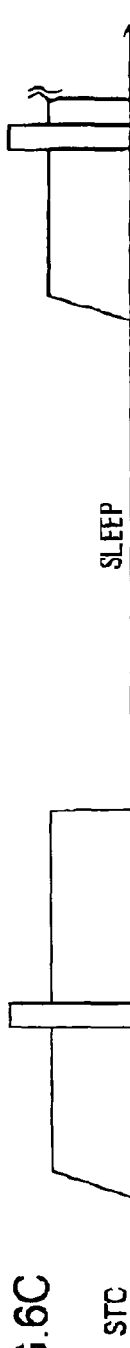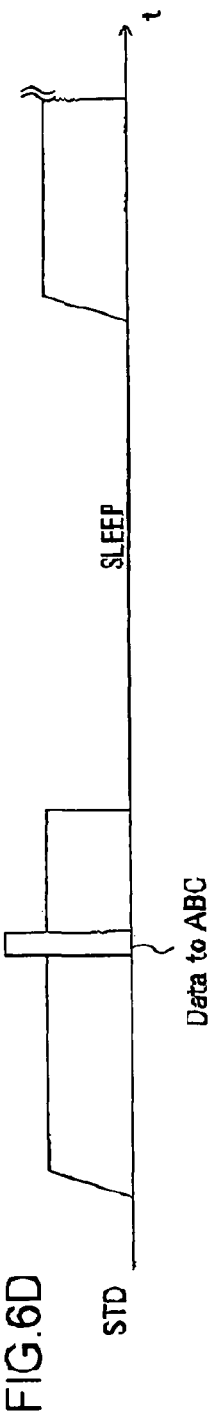

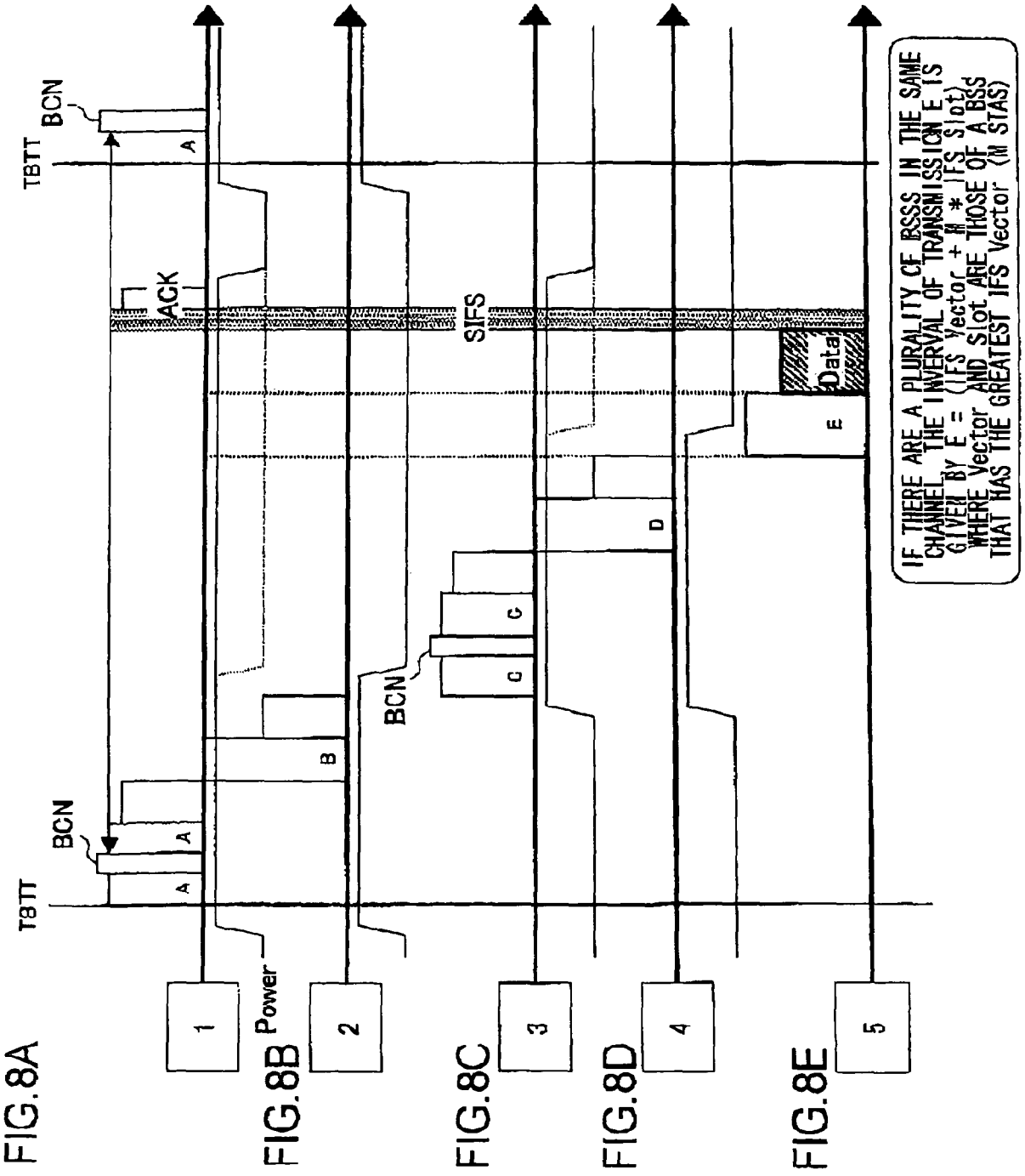

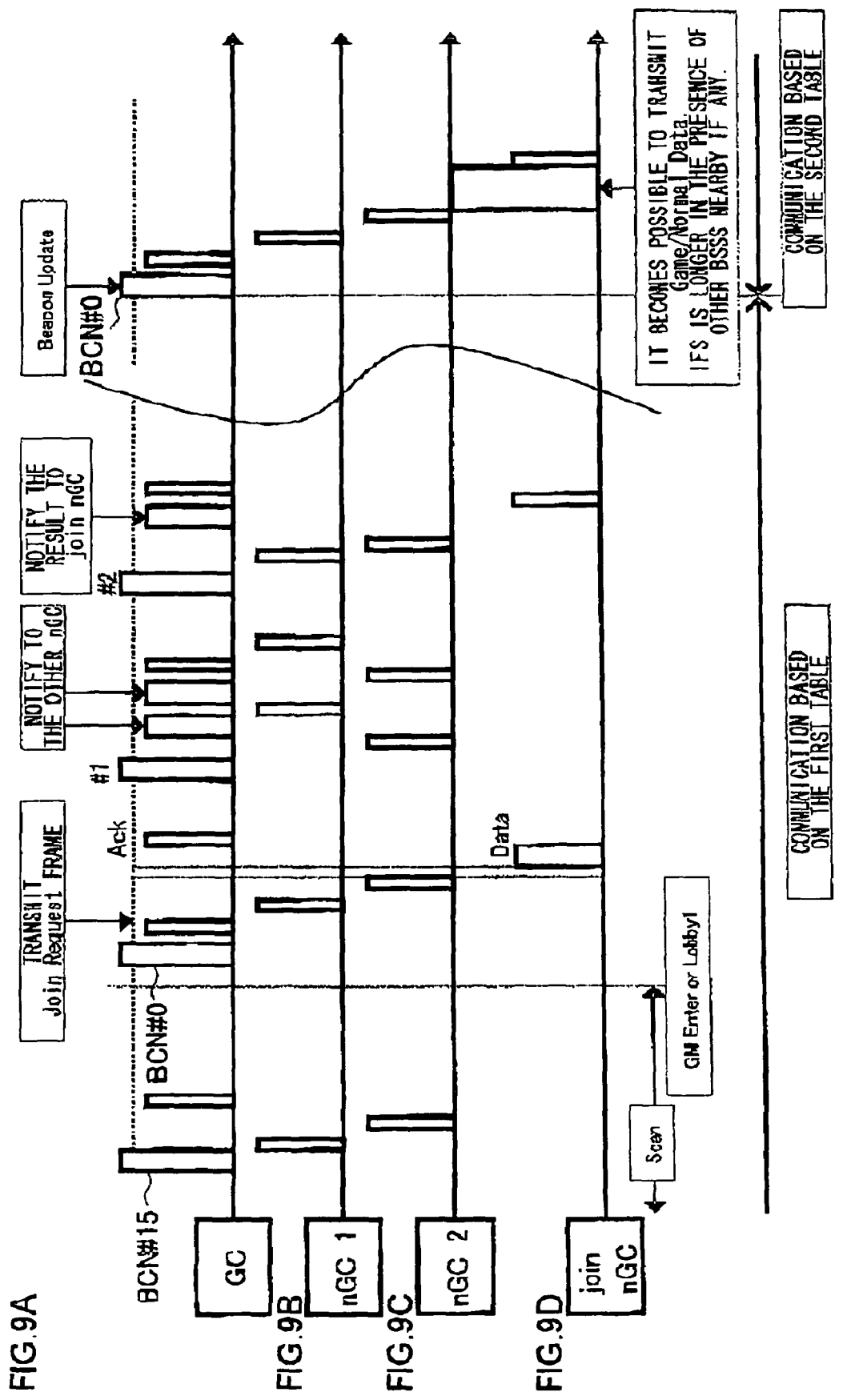

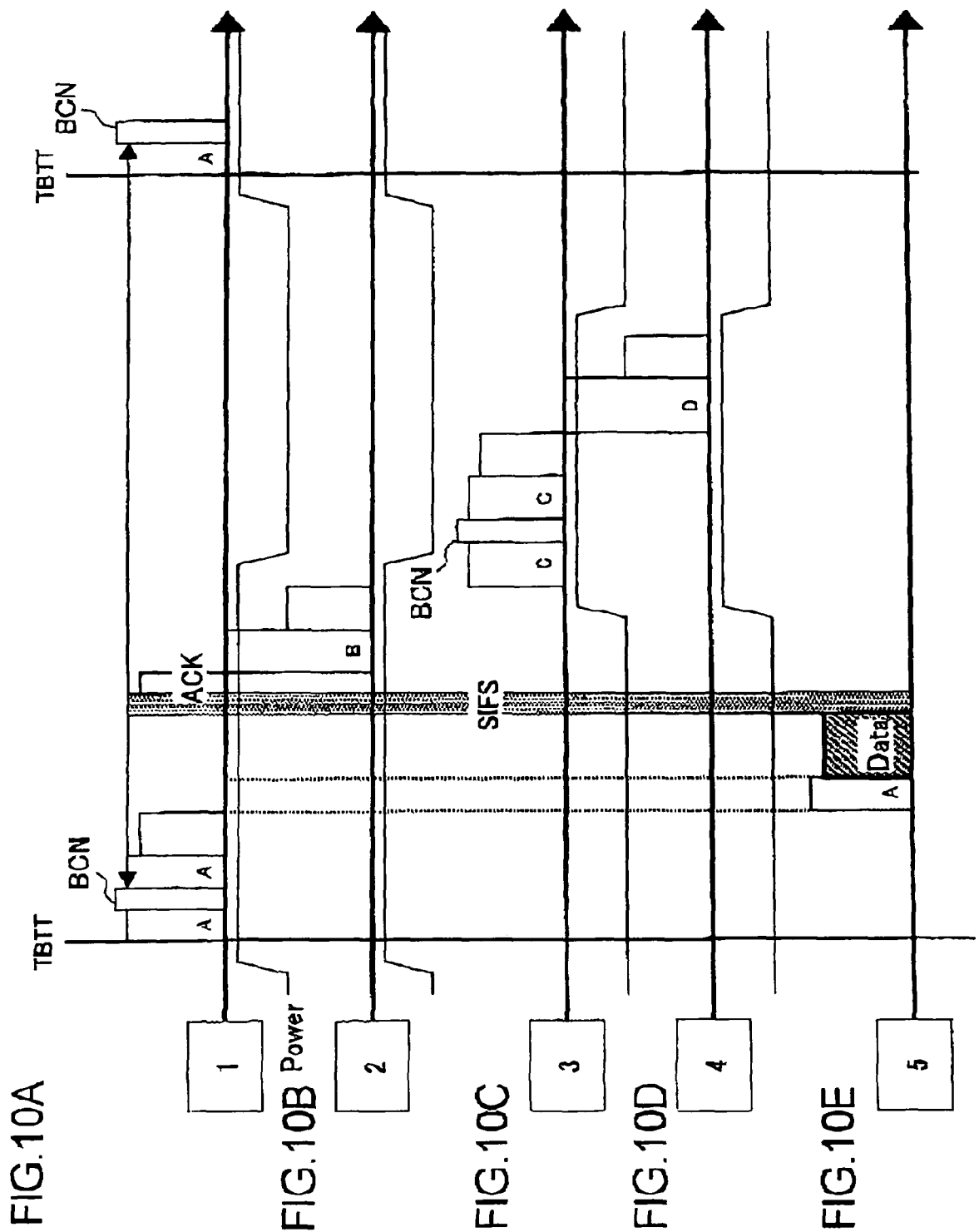

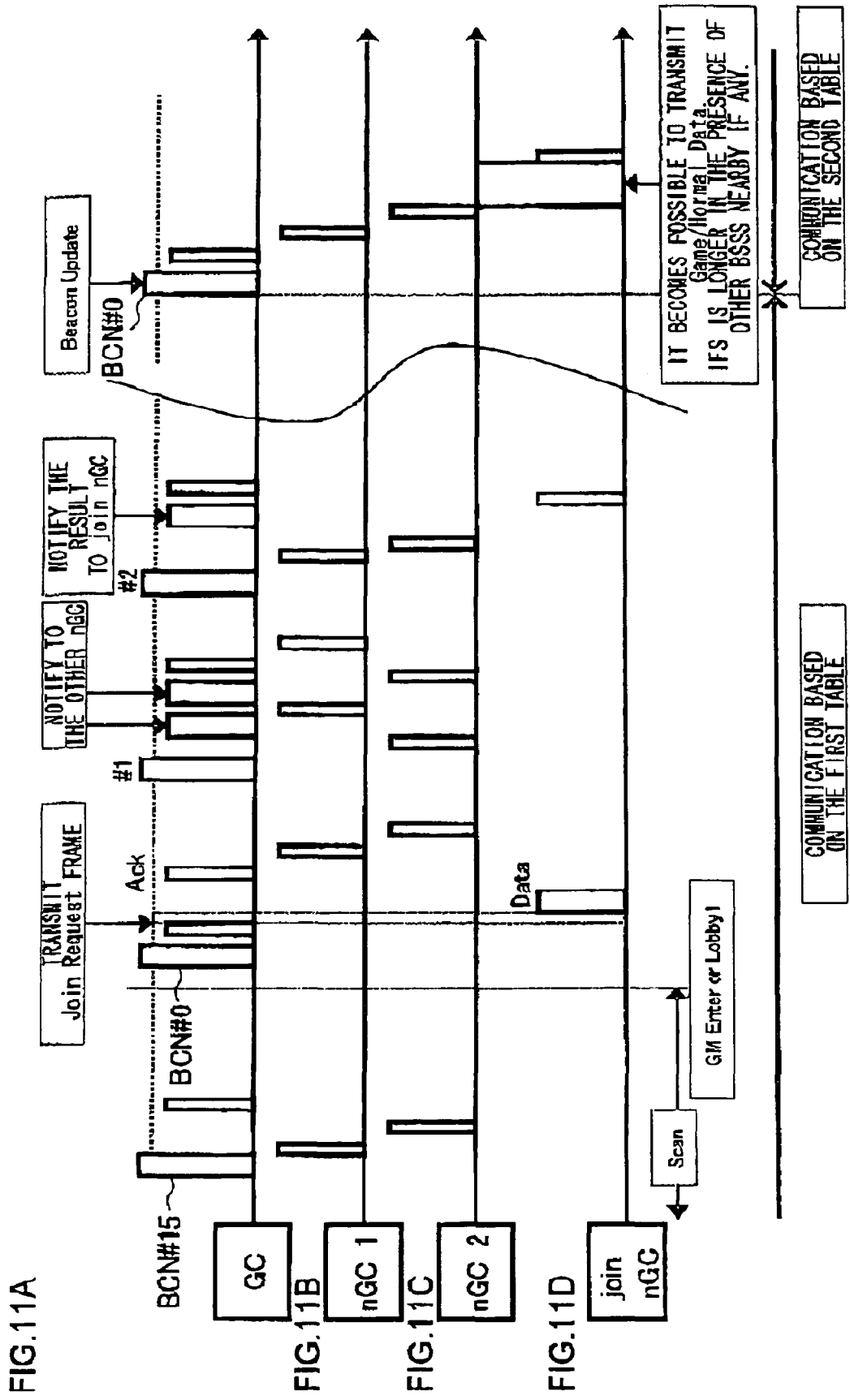

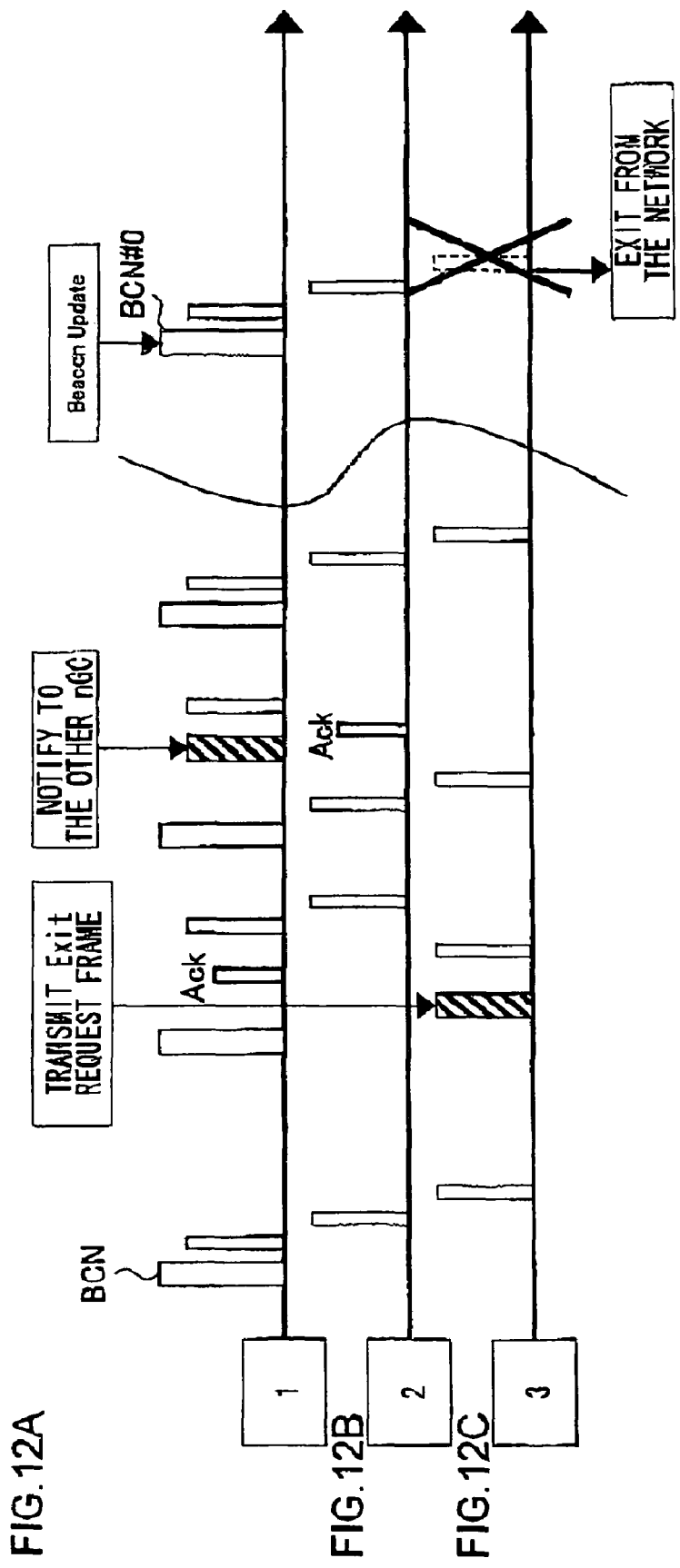

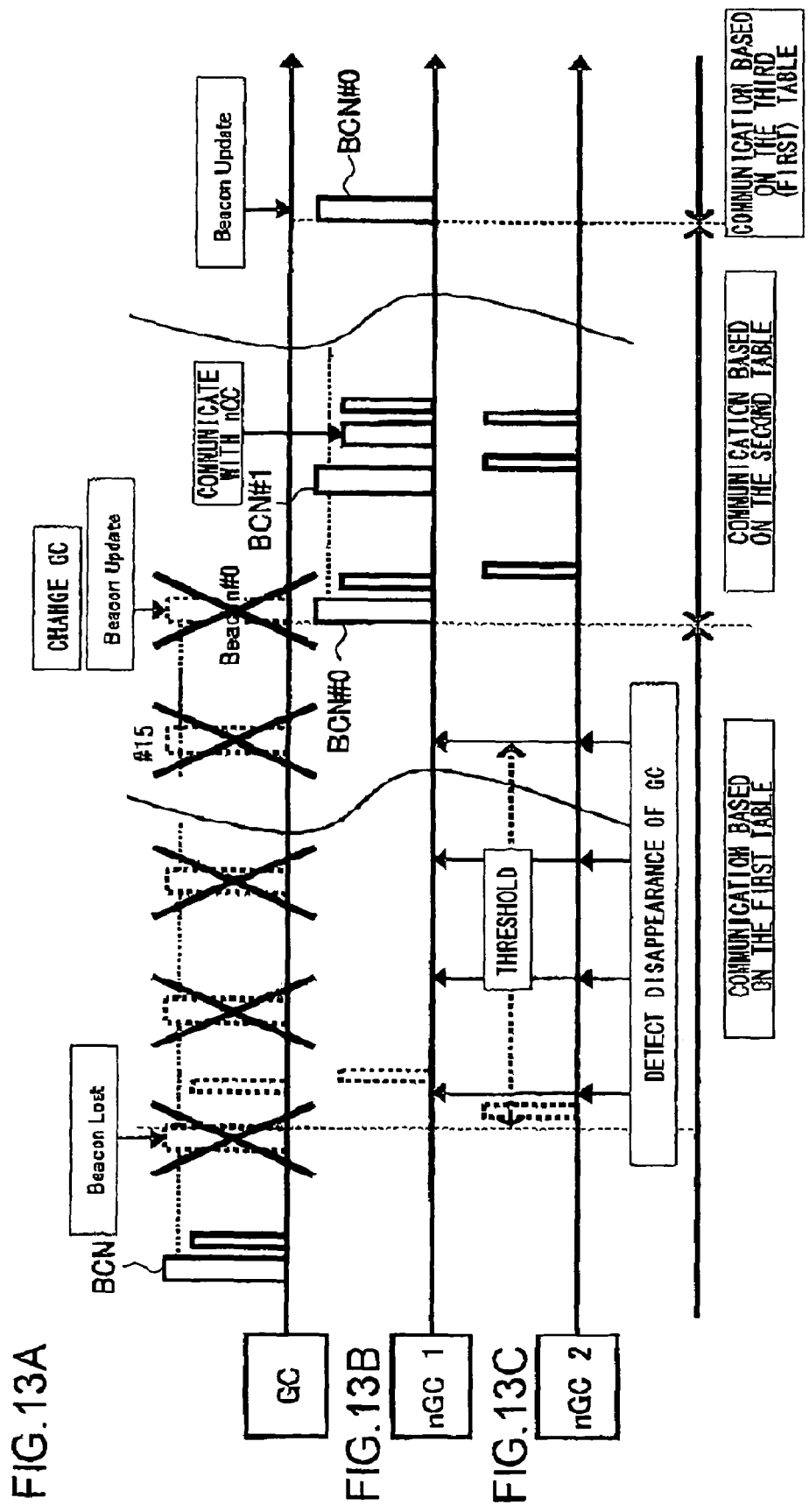

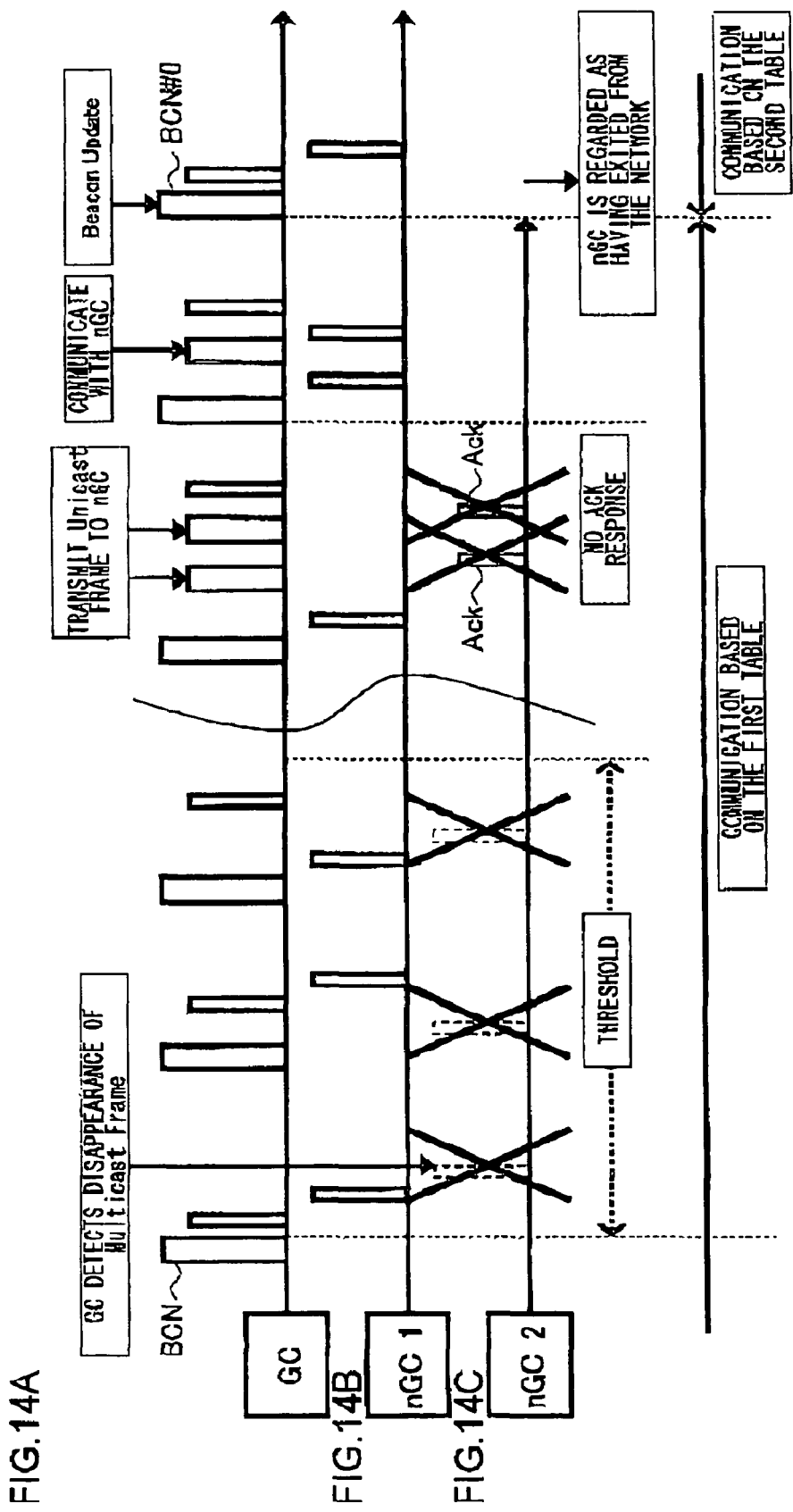

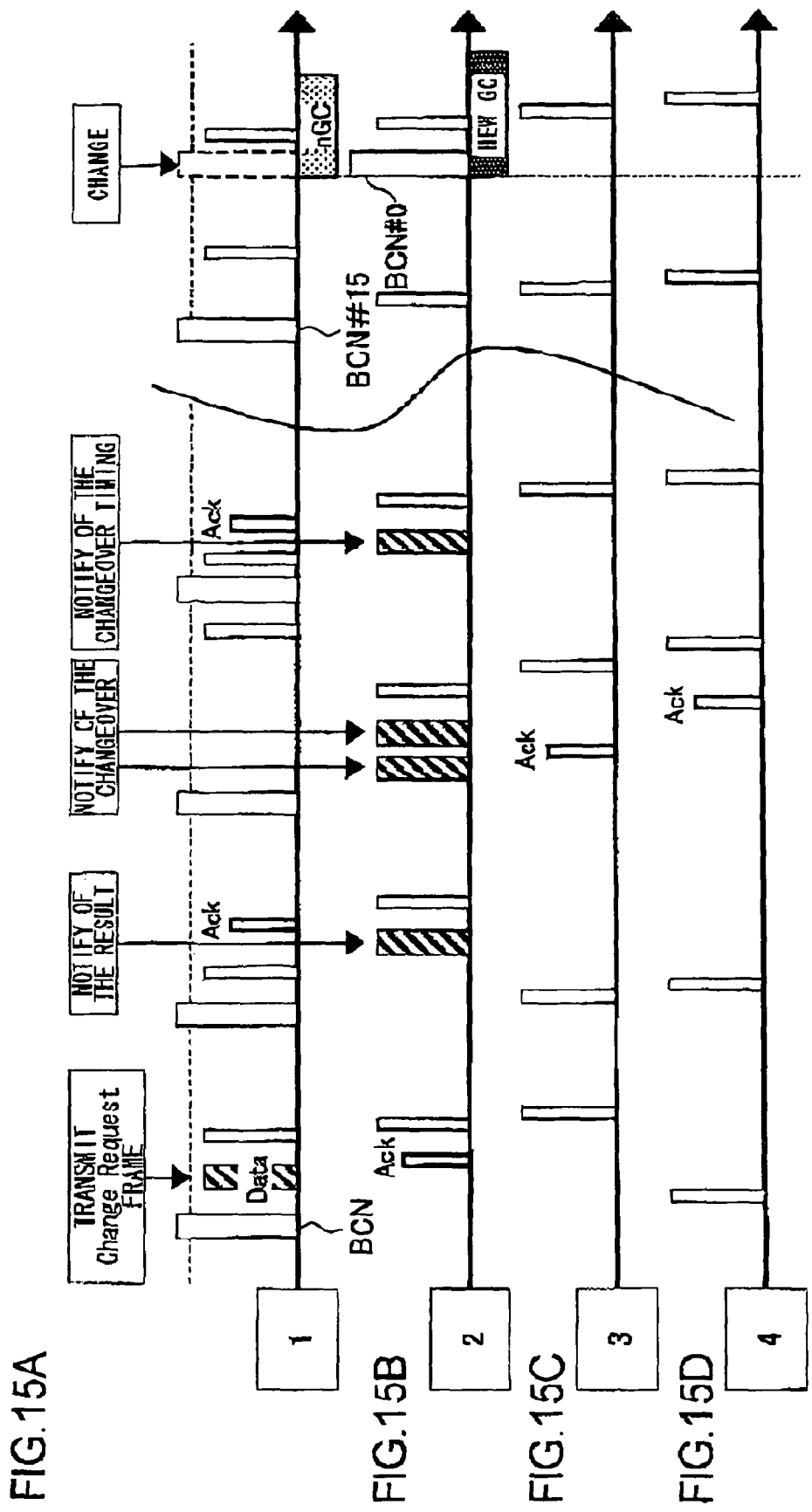

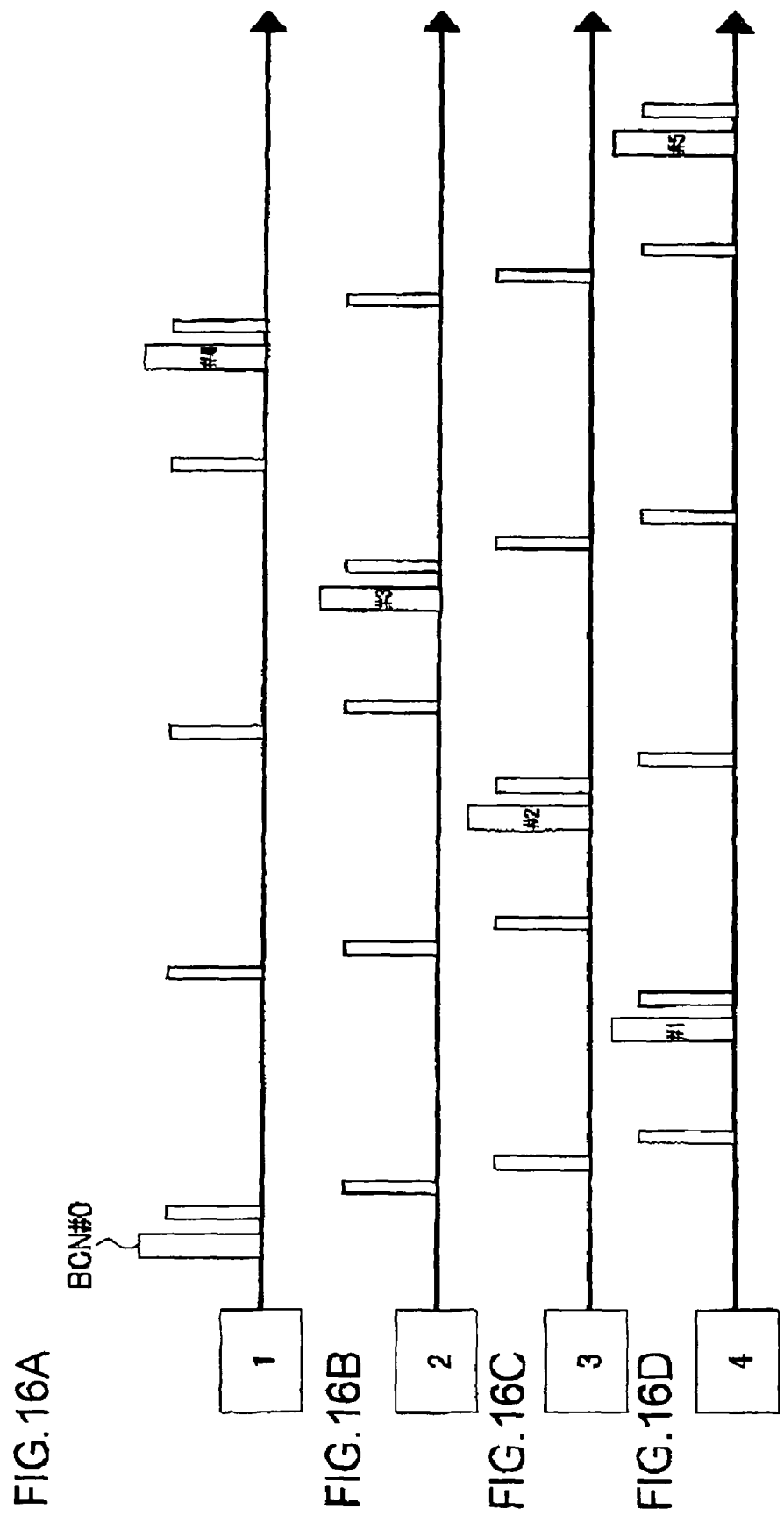

ns in a power saving mode, standardized in IEEE 802.11.

COMMUNICATION TERMINAL DEVICE, COMMUNICATION SYSTEM, COMMUNICATION METHOD, AND PROGRAM

BACKGROUND OF THE INVENTION

1. Field of the Invention

The invention relates to a technology by which a plurality of communication terminal devices communicate with one another.

2. Description of the Related Art

With the miniaturization and weight saving of information terminals in recent years, it has become common to carry information devices around. Considerable research has thus been done on the construction of a wireless ad-hoc network as what is called on-demand communication.

Since the ad-hoc network requires no base station or access point, it is easily possible to construct one even in locations with no such infrastructure.

For example, by using this ad-hoc network, a plurality of users can bring their portable game consoles to hold mutual wireless communication and enjoy a game together.

An ad-hoc network is constructed by terminals communicating with one another through the use of IEEE 802.11, Bluetooth, and other technologies. Unless external power supply is available full-time, portable terminals are driven by limited amounts of battery power. It is thus preferable to suppress battery consumption as much as possible. For that purpose, power control processing in power saving mode is standardized even in such communication standards as IEEE 802.11.

FIGS. 1A to 1D are timing charts showing station operations in a power saving mode, standardized in IEEE 802.11.

As shown in FIGS. 1A to 1D, one of stations (wireless communication terminal devices) STA to STD initially transmits a beacon signal BCN. The beacon signal BCN is an annunciation signal which is communicated to all the stations.

A time window called ATIM (Announcement Traffic Indication Message) window is started in succession to the transmission of the beacon signal BCN. This window shows the time during which the nodes must be kept active.

In the power saving mode of the IEEE 802.11 standard, each of the stations can transmit an ATIM signal during the ATIM window so as to prevent other station(s) from sleeping.

In the example of FIGS. 1A to 1D, the station STB unicasts the ATIM signal to the station STC. The station STC returns an ACK (ACKnowledge) signal for acknowledging receipt to the station STB.

Since the stations STA and STD are not involved in transmission nor reception of the ATIM signal, they can enter a sleep state when the ATIM window ends.

On the other hand, neither of the stations STB and STC can enter sleep. After the end of the ATIM window, the station STB transmits data to the station STC. Receiving the data, the station STC returns the ACK signal to the station STB.

Before the end of this beacon interval BCNI, the stations STA and STD are activated to transmit or receive another beacon signal BCN. In the next ATIM window, none of the stations transmits or receives any ATIM signal. After the end of the ATIM window, all the stations STA to STD are thus in the sleep state.

Incidentally, the timing charts of FIGS. 1A to 1D have dealt with a quite simple case, for the sake of explaining the power saving mode of the IEEE 802.11 standard. When a plurality of portable game consoles construct a network, however, status information on each individual game console must be exchanged mutually, and thus more signals are communicated. In game applications that demand highly real-time responses, the status information must be updated frequently. It is thus preferable to transmit data via multicast communication.

By the way, as mentioned above, the use of ad-hoc networks makes it possible for a plurality of users to bring their portable game consoles to hold mutual wireless communication and enjoy a game together.

While it is possible to combine a plurality of game consoles to hold mutual wireless communication and enjoy games, relevant technologies focusing on real-time responses do not provide the functions of joining and exiting from the network in the middle of communication, detecting disappearance of stations (communication terminals), and changing over a coordinator function. It has thus been desired to realize a communication terminal which has all the functions of joining and exiting from a network in the middle of communication, detecting disappearance of stations (communication terminals), and changing over the coordinator function.

SUMMARY OF THE INVENTION

Thus, a general purpose of the present invention is to is provide a communication terminal device, a communication system, a communication method, and a program which can realize functions of joining and exiting from a network in the middle of communication, detecting disappearance of stations (communication terminals), and/or changing over a coordinator function.

A communication terminal device is provided. In one embodiment of the present invention, the communication terminal device for forming a group with at least one other communication terminal device and performing communication within the group comprises: a transmission unit which transmits at least an annunciation signal and/or a packet including a communication parameter to the at least one other communication terminal device; a reception unit which receives at least an annunciation signal and/or a packet including a communication parameter from the at least one other communication terminal device; and a control unit which exercises communication control in accordance with a communication parameter pertaining to a network, the control unit being capable of responding to a communication parameter, different from a communication parameter which is being used in communication in progress, included in a packet received by the reception unit.

In another embodiment of the present invention, a communication system is provided. The communication system comprises a plurality of communication terminal devices for forming a group and performing communication within the group. In the communication system, each of the communication terminal devices includes: a transmission unit which transmits at least an annunciation signal and/or a packet including a communication parameter to the at least one other communication terminal device; a reception unit which receives at least an annunciation signal and/or a packet including a communication parameter from the at least one other communication terminal device; and a control unit which exercises communication control in accordance with a communication parameter pertaining to a network, the control unit being capable of responding to a communication parameter, different from a communication parameter which is being used in communication in progress, included in a packet received by the reception unit.

In another embodiment of the present invention, a communication method is provided. The communication method for forming a group with at least one other communication terminal device and performing communication within the group comprises: transmitting at least an annunciation signal and/or a packet including a communication parameter to the at least one other communication terminal device; receiving at least an annunciation signal and/or a packet including a communication parameter from the at least one other communication terminal device; exercising communication control in accordance with a communication parameter pertaining to a network, and responding to a communication parameter, different from a communication parameter which is being used in communication in progress, included in a packet received, thereby exercising communication control in accordance with a communication parameter.

In another embodiment of the present invention, a computer program written in a computer-readable format so that a computer system executes processing for forming a group with at least one other communication terminal device and performing wireless communication within the group is provided. The program comprises: transmitting at least an annunciation signal and/or a packet including a communication parameter to the at least one other communication terminal device; receiving at least an annunciation signal and/or a packet including a communication parameter from the at least one other communication terminal device; exercising communication control in accordance with a communication parameter pertaining to a network, and responding to a communication parameter, different from a communication parameter which is being used in communication in progress, included in a packet received, thereby exercising communication control in accordance with a communication parameter.

Incidentally, any combinations of the foregoing components, and any conversions of expressions of the present invention from/into methods, apparatuses, systems, recording media, computer programs, and the like are also intended to constitute applicable aspects of the present invention.

BRIEF DESCRIPTION OF THE DRAWINGS

FIGS. 6A to 6D are timing charts showing station operations in power-saving mode;

FIGS. 8A to 8E are diagrams for explaining a mid-game join function according to the present embodiment;

FIGS. 9A to 9D are diagrams for explaining the mid-game join function according to the present embodiment;

FIGS. 10A to 10E are diagrams for explaining another example of the mid-game join function according to the present embodiment;

FIGS. 11A to 11D are diagrams for explaining the sequence for the mid-game join;

FIGS. 12A to 12C are diagrams for explaining the sequence for exit;

FIGS. 13A to 13C are diagrams for explaining the processing for situations where the game coordinator becomes invisible (disappears) from the network;

FIGS. 14A to 14C are diagrams for explaining the processing for situations where a communication terminal becomes invisible (disappears) from the network;

FIG. 15 is a diagram for explaining the procedure for changing over the coordinator function; and FIG. 16 is a diagram for explaining the mechanism by which the order of transmission of beacons and transmission order values are synchronized for transmission.

DETAILED DESCRIPTION OF THE INVENTION

Hereinafter, an embodiment of the present invention will be described in conjunction with the drawings.

Figure 1A:
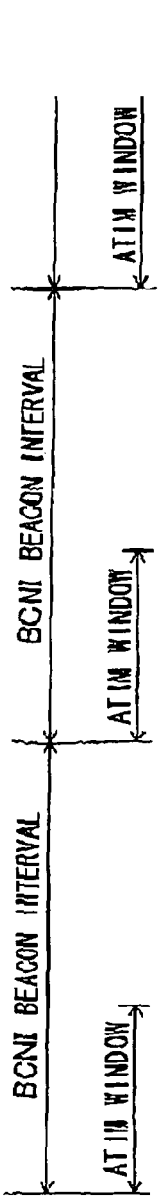
FIGS. 1A to 1D are timing charts showing station operations in standard power-saving mode in IEEE 802.11.
Figure 1B:
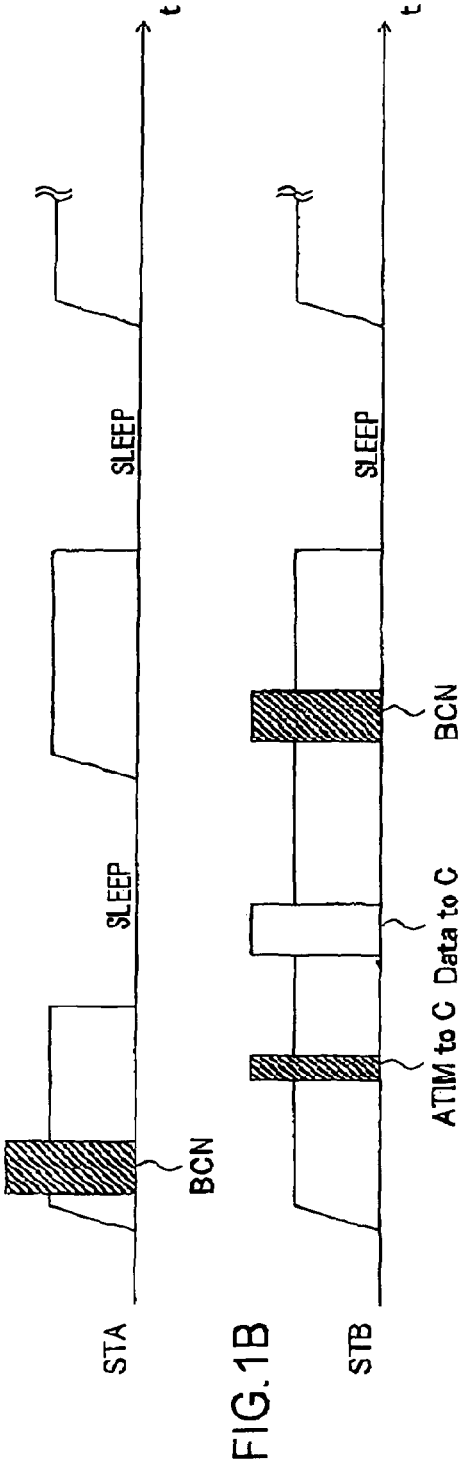
Figure 1C:
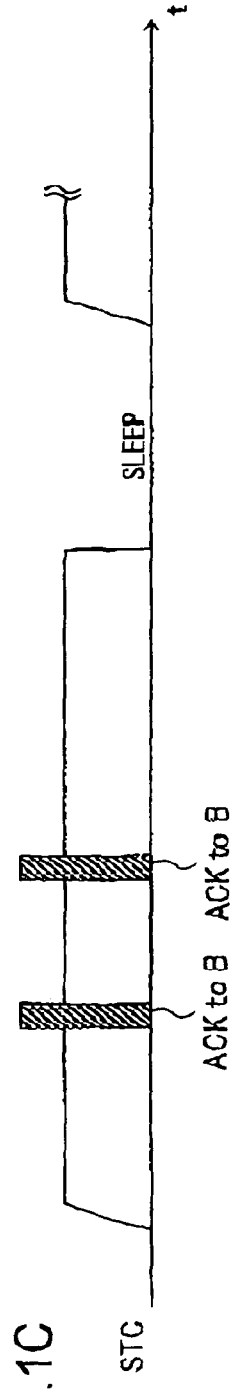
Figure 1D:
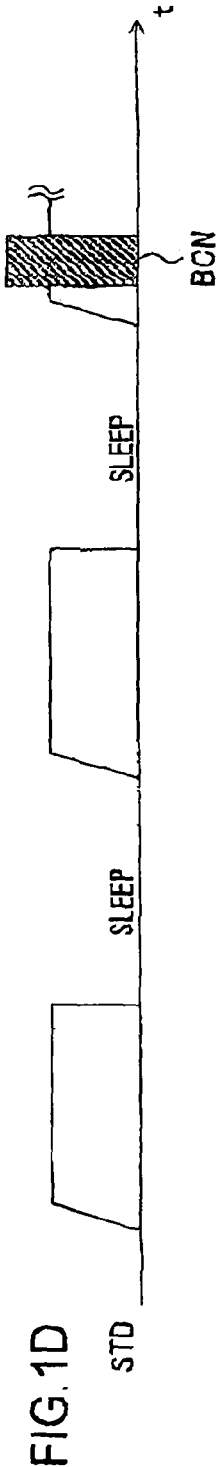
Figure 2:
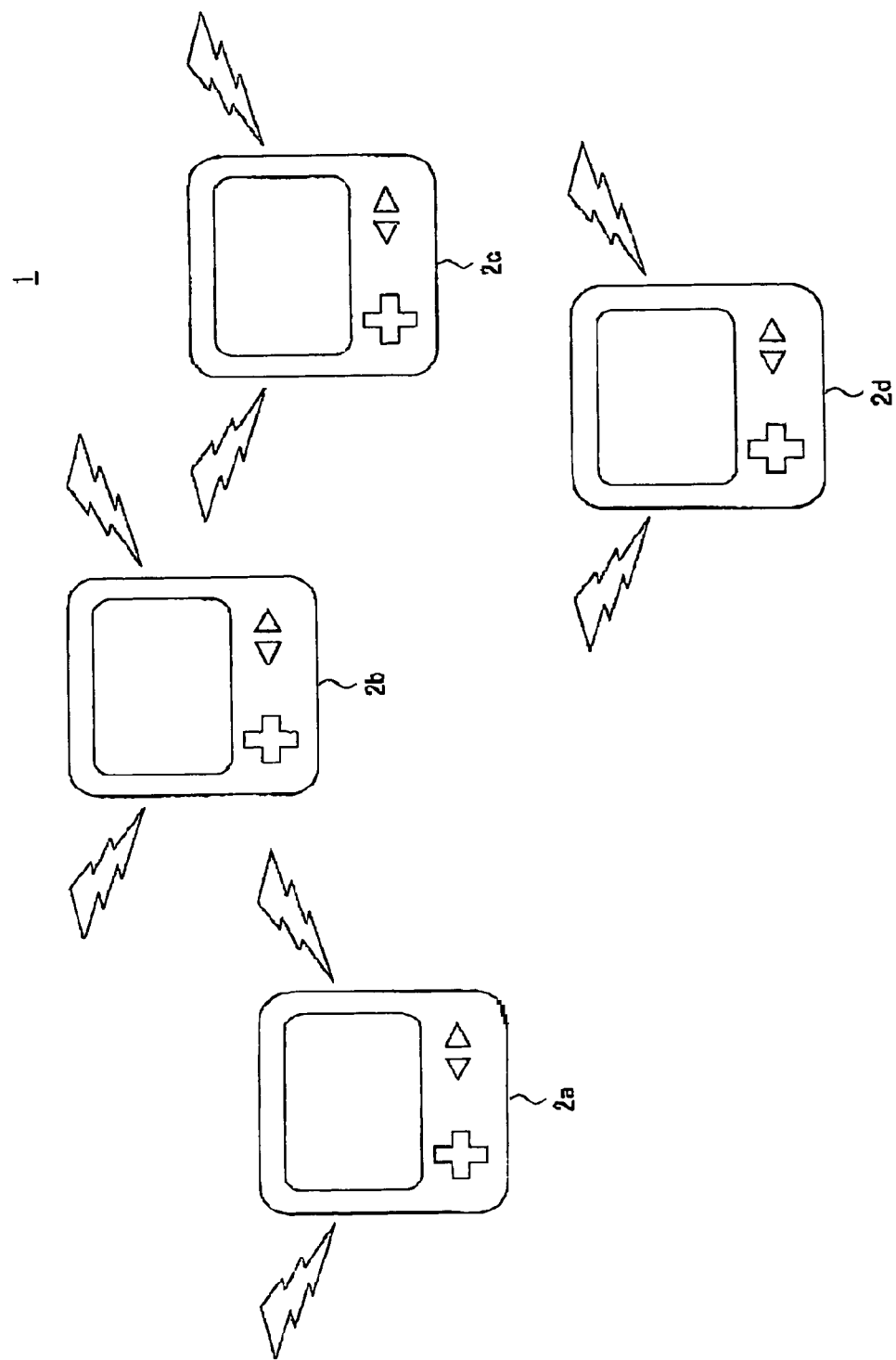
FIG. 2 is a diagram showing an example of configuration of a communication system according to an embodiment.

FIG. 2 is a diagram showing an example of configuration of a communication system according to the present embodiment.

In FIG. 2, the communication system 1 comprises a plurality of communication terminal devices (for the sake of convenience, hereinafter referred to as "communication terminals" or "stations"). Here, four game consoles 2a, 2b, 2c, and 2d are shown as the communication terminals. Incidentally, the number of game consoles 2 is not limited to four, but may be any number other than four.

The game consoles 2 (2a to 2d) have wireless communication functions. The plurality of game consoles 2a to 2d are gathered to construct a wireless network.

For example, IEEE 802.11b or other wireless LAN standards may be used to construct a wireless ad-hoc network. The IEEE-802.11b MAC layer technology adopts CSMA/CA (Carrier Sense Multiple Access with Collision Avoidance) access control mode, in which each terminal has the function of checking if a communication channel is idle for more than a certain period before data transmission. This waiting time is the minimum time plus a random duration of latency which is determined for each individual terminal. This prevents the plurality of terminals from making transmission simultaneously a certain period of time after the previous communication and thus causing signal collision.

In unicast communication, whether or not data is actually transmitted properly is determined depending on if the ACK (Acknowledge) signal arrives from the reception side. When the ACK signal does not arrive, the data can thus be transmitted again on the assumption that there is a communication failure.

Since the communication system 1 constructs an ad-hoc network, communications among the plurality of game consoles 2 (2a to 2d) can be achieved without requiring any additional infrastructure such as a base station and an access point.

Each individual game console 2 receives status information on the others, so that a plurality of players can play the same game application at the same time.

Game applications may be broadly classified into two groups in terms of real-time responses, i.e., ones that demand highly real-time responses and ones not. Among the examples of the games that demand highly real-time responses are beat'-em-up games and racing games. These games are of rapid progress, and input operations from users must be reflected immediately on outputs such as the game screens. Meanwhile, the examples of the games not demanding much real-time responses include board games such as chess and mah-jongg, and RPGs (role-playing games). These are of relatively slow progress.

The game screens are updated at predetermined frame rates or refresh rates. Currently, the overwriting rate for a single field is approximately 16.7 msec (1/60 sec).

With the game applications demanding highly real-time responses, i.e., that require small latency, a game console thus preferably notifies the other game consoles of its own status information and is notified of the status information on the others at least once in each single field (16.7 msec). For example, in a racing game, the status information refers to absolute information including course position, car direction, and speed.

Incidentally, the reason why absolute information is used here is that wireless environments are not high in communication reliability. If sufficient reliability is secured, past-present differential information will do.

In the communication system 1, the game consoles 2 execute an application asynchronously independent of each other. Incidentally, with game applications that do not require small latency, a failure to update data field by field would have little impact on the application processing since retransmission is available.

Hereinafter, description will be given of three types of communication schemes in which the game consoles communicate directly with each other to realize the communication system 1.

For the communication standard, IEEE 802.11 protocols shall be used here. The IEEE 802.11 protocols have the advantage of easier Internet connection as compared to Bluetooth and other protocols. When the game consoles 2 adopt the IEEE 802.11 communication protocols, they can not only construct a wireless network but also access other terminals over the Internet. This improves the scalability of the communication system 1.

<Type 1>

In type 1, the stations perform unicast communications with a single designated partner each.

Figure 3A:
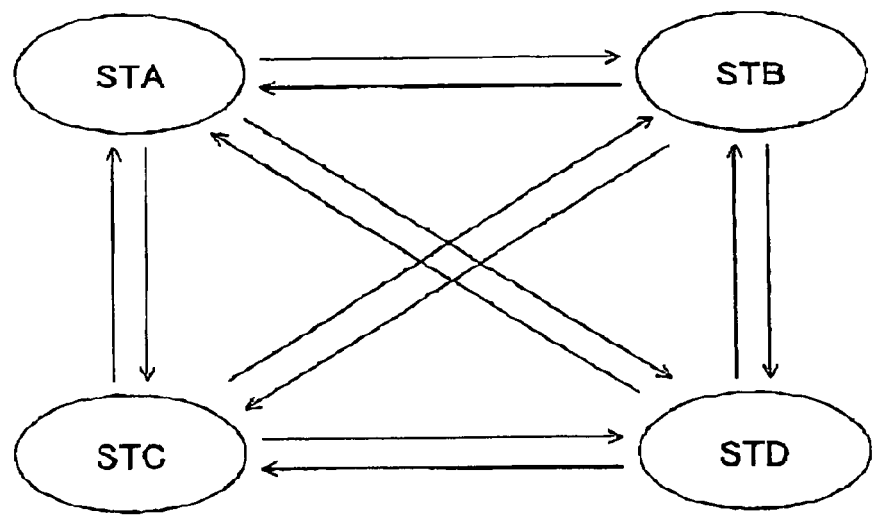
FIGS. 3A and 3B are diagrams showing a state where stations hold unicast communications with one another, and a state where an access point and stations hold unicast communications with each other.

FIG. 3A shows the state where four stations STA to STD hold unicast communications with one another. Incidentally, the stations STA to STD correspond to the game consoles 2 in the communication system 1. With 802.11 protocols, each station ST transmits status information to the other three stations. Consequently, in the unicast communications, the status information is communicated in a total of 12 times. Taking account of an ACK signal to be returned as a reception response, a total of 24 communications are performed. In applications that require small latency, the 24 communications must be performed within a single field. CSMA/CA is predicated on the control of avoiding packet collision, whereas it is not easy to perform 24 communications within 16.7 msec while avoiding packet collision. As the number of stations increases, the number of communications required in each single field increases further. From the foregoing reason, it can be seen that the communication scheme of type 1 shown in FIG. 3A is suited to game applications that do not require small latency.

<Type 2>

In type 2, one of the stations functions as an access point, and holds unicast communications with the other stations.

Figure 3B:
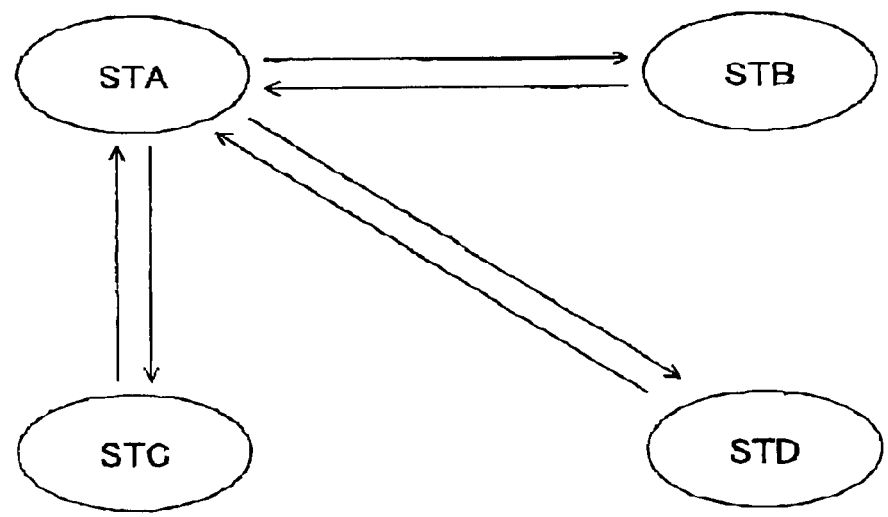

FIG. 3B shows the state where the station STA serves as an access point, and the other three stations STB, STC, and STD perform unicast communications with the station STA. The station STA receives status data from the other three stations STB, STC, and STD. The station STA combines its own status information and the status information on the stations STC and STD into a single packet, and transmits it to the station STB. Similarly, the station STA transmits the status information on the three stations STA, STB, and STD other than the station STC to the station STC. It also transmits the status information on the three stations STA, STB, and STC other than the station STD to the station STD.

Consequently, in this unicast communication, the status information is communicated in a total of 6 times. Taking, account of the ACK signal to be returned as a reception response, a total of 12 communications are performed.

As compared to the communication scheme of type 1 shown in FIG. 3A, the load on the host CPU of the station STA, or the access point, increases inevitably. Nevertheless, the communication scheme of type 2 can be said to have superiority over type 1 in data communications that require higher speed, because of the reduced number of communications.

<Type 3>

In type 3, each individual station performs multicast communication. In IEEE 802.11 ad-hoc networks, network-specific BSSIDs (Basic Service Set IDs) having random values are determined for the sake of distinction from others. Thus, each station includes BSSID into data frames so that its own data can be multicast to the group of stations in the same base service area. Incidentally, when communication protocols other than IEEE 802.11 are used, each station may designate the addresses of the other three stations for multicast communication.

Figure 4:
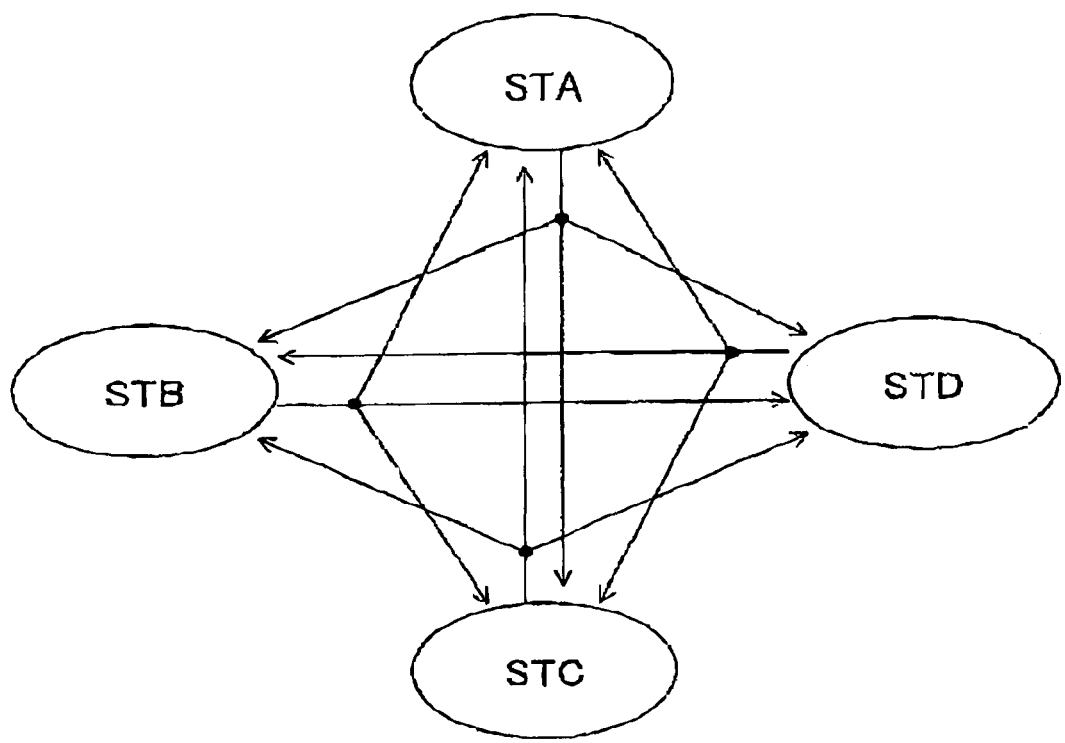
FIG. 4 is a diagram showing the state where each individual station performs multicast communication.

FIG. 4 shows the state where each station multicasts the same data. More specifically, the station STA includes BSSID into its data frame, and transmits its own status information in a single packet. The same holds for the stations STB, STC, and STD. As a result, in this multicast communication, the status information is communicated in a total of four times. Incidentally, the multicast communication according to the present embodiment may or may not be configured to involve ACK-signal responses.

Type 3 allows a significant reduction in the number of communications as compared to the communication schemes of types 1 and 2 shown in FIGS. 3A and 3B. This communication scheme is thus best suited to data communications that require high speed, with little increase in the processing load on each station.

Consequently, it can be said that the communication scheme of type 3 shown in FIG. 4 is the best suited for game applications that require small latency.

As mentioned previously, the multicast communication according to the present embodiment may be configured to involve ACK-signal responses.

Nevertheless, if the ACK function is simply applied to the multicast communication, the stations (communication terminals) need to transmit their respective ACK signals in response to the multicast packets. Consequently, the number of ACK signals to be transmitted can be enormous, with an increase in power consumption if the basic service set (BSS) includes a number of stations.

Thus, in this preferred embodiment, the multicast packets themselves are given the ACK function. This makes it possible to acknowledge reception to the others without band occupation. The number of transmissions is thus decreased to reduce the power consumption.

Figure 5:
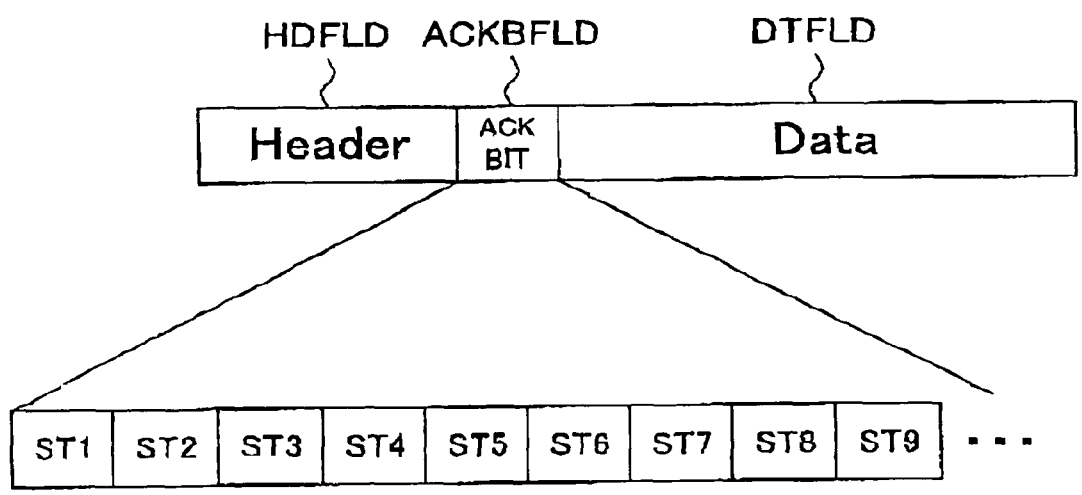
FIG. 5 is a diagram for explaining an example of ACK bits according to the present embodiment.

In the multicast communication scheme, the ACK function is realized, for example, by adding ACT bits to part (top) of multicast packet as shown in FIG. 5. The ACK bits are allocated for respective stations ST1 to STn.

In the example of FIG. 5, the ACK bit field ACKBFLD is arranged between a header field HDFLD and a data field DTFLD.

The transmitting stations STn can acknowledge reception to the senders by transmitting the data with the bits of the received senders turned to "1."

As described above, the three types of communication schemes can be applied to the communication system 1 of the present embodiment. In any of the types, power saving is preferably exercised of the game consoles 2 (stations). As is the case with cellular phone terminals, the wireless ad-hoc network terminals can also be operated intermittently on the time axis, with a significant contribution to saving of electric power.

Incidentally, in the following description, a sleep state shall refer to one in which only part of a wireless interface is rendered operating or capable of operation with extremely low power consumption by such means as interrupting a current to a bias circuit of the transceiver unit (chiefly consisting of analog circuits) of the wireless interface, and stopping the clock for a modem unit and/or a MAC unit of the same. An active state shall refer to one in which all the facilities of the wireless interface are operating or capable of operation.

In the communication system according to the present embodiment, the period of the sleep state can be increased to achieve power saving.

In terms of feasibility of the power saving, applications not requiring small latency are typically easier to save power since they can be kept in the sleep state longer.

Hereinafter, description will be given of a communication method that is capable of power saving even in such an environment as a game application under severe latency requirements, requiring high speed.

FIGS. 6A to 6D are timing charts showing station operations in power saving mode.

In these timing charts, the beacon signals BCN are annunciation signals which are transmitted to all the stations. Each beacon frame includes required fields such as a time stamp, a beacon interval BCNI, capability information, a service set ID, and a supported rate, and option fields such as an FH parameter set, a DS parameter set, a CF parameter set, an IBSS parameter set, and a TIM. Option information is present only if need to be used.

Each station waits a random length of waiting time called back-off since target beacon transmission time (TBTT) or the latest time of the previous beacon interval, before it transmits a beacon signal BCN.

When a station ST receives a beacon signal BCN before its own transmission time, it cancels the pended transmission of the beacon signal BCN.

In the communication system 1, the beacon signals BCN are thus transmitted by only a single station ST. Since the beacon frames must be processed by every station, all the stations STA to STD are activated into an active state before TBTT.

In the case shown in FIGS. 6A to 6D, the station STA is in charge of the beacon issuance. This can avoid the situation that a plurality of stations issue beacon signals simultaneously so that the beacon signals collide with each other. In the communication shown in FIGS. 6A to 6D, the multicast communication of type 3 is employed for the sake of high-speed data communication. This makes it possible to transmit status information to a plurality of stations in a single packet.

The communication system 1 according to the present embodiment is also configured so that the plurality of stations (communication terminals) ST are grouped to form a network, and in the network, each of the communication terminals can achieve power saving autonomously by receiving signals from the other stations (communication terminals) in the group. To make a distinction from the foregoing one, this power saving mode will be referred to as autonomous control power saving mode.

In the present embodiment, for the sake of avoiding collision between the signals of the communication terminals, each individual communication terminal determines its own transmission timing based on the annunciation signal (beacon signal) transmitted from a coordinator within the network. This function will be referred to as collision avoidance mode. In this collision avoidance mode, the order of transmission of the individual communication terminals can be changed upon each transmission.

In ad-hoc networks, the coordinator is a single communication terminal or a group member. In infrastructure networks, the coordinate is an access point.

Note that IEEE 802.11b MAC layer technology adopts CSMA/CA access control scheme, which is predicated on that signal collision is avoided by carrier sensing. This still leaves the possibility that a plurality of communication terminals transmit signals simultaneously, in which case signal collision can occur. For that reason, the collision avoidance mode is also effectively used with IEEE 802.11. It can also be used effectively with other communication protocols. The autonomous control power saving mode and the collision avoidance mode can be achieved substantially by software processing alone. This provides the advantage of easy implementation.

Initially, in the network in which the plurality of communication terminals join, communication parameters to be described later are determined, for example, by presetting the stations or conducting lobby-IBSS negotiation between the applications in normal IEEE 802.11 ad-hoc mode or infrastructure mode. When the stations are the game consoles 2, the communication parameters may be preset into game programs that are installed on the disks to be loaded into the game consoles 2. In the case of conducting lobby-IBSS negotiation, the coordinator unicasts a packet including the communication parameters to the other group members. This unicast communication can be made in standard ad-hoc mode.

In the present embodiment, each of the communication terminals conducts network switching, thereby realizing the functions for mid-game join, mid-game exit, disappearance detection, and changeover of the coordinator function.

To achieve the network switching, each station ST stores a plurality of communication parameters.

As employed herein, the communication parameters include the following:
a) frequency channel;
b) SSID (Service Set IDentity);
c) TBTT (Target Beacon Transmission Time);
d) the modulation/demodulation schemes of the physical layer;
e) the MAC addresses and station numbers (device numbers) of the respective stations;
f) IFS (Inter Frame Space) generation mode (802.11 standard scheme, or IFS vector-based QoS scheme);
g) IFS vector values (available only in the IFS vector-based QoS scheme); and
h) security mode/common key.

In addition, the communication parameters further include the following:
i) a multicast address; and
j) the MAC address of the game coordinator GC, or an identifier for identifying the game coordinator GC.

These communication parameters are included in beacon information, and transmitted from the game coordinator GC to the other terminals within the network.

Among the foregoing communication parameters, for example, the IFS vector-based QoS scheme is selected for f) IFS generation mode. What are referred to as g) IFS vector values are time values to be used to determine the transmission times (transmission timing) of the respective stations, in units of microseconds. IFS vector values include IFS0 for determining the reference time of transmission and an IFS offset for determining the offset time from IFS0. Incidentally, the QoS scheme using IFS vector values is intended for the collision avoidance mode for avoiding signal collision, and thus has no direct relation to the realization of the autonomous control power saving mode. The autonomous control power saving mode and the collision avoidance mode both can be exercised simultaneously, however, for more efficient communication.

By the way, as mentioned above, the use of ad-hoc networks makes it possible for a plurality of users to bring their portable game consoles to hold mutual wireless communication and enjoy a game together.

As above, it is possible to combine the plurality of game consoles to hold mutual wireless communication and enjoy games. Here, the game consoles to be used in the communication system 1 of the present embodiment have the functions of joining and exiting from the network in the middle of communication, detecting disappearance of stations (communication terminals), and changing over the coordinator function.

The following description will be given on the assumption that the network establishes the following protocol.
<Protocol>

When the plurality of stations (wireless communication terminal devices) hold ad-hoc communication, one of the terminals is given the coordinator function for beacon transmission. This terminal will sometimes be referred to as game coordinator (hereinafter, GC).

The other communication terminals (non-game coordinators; hereinafter, nGC) within the network cannot transmit their data frames unless they can receive beacon frames from GC. In other words, receiving beacons is equivalent to being granted transmission opportunities.

The timing for the game coordinator GC and the other communication terminals nGC to transmit their frames is determined by table values (referred to as transmission order values) which are determined from initial values, slot values, the number of terminals, and beacon numbers. The timing varies for each transmission opportunity, thereby achieving uniform transmission opportunities.

All the terminals within the network always transmit one or more pieces of data in each beacon interval. When one terminal receives frames from all the other terminals without error, it enters a power saving (sleep) state until the next beacon transmission.

As employed herein, the range of the network shall refer to the inside of the coverage of the wireless signals.

Assuming the foregoing, description will now be given in the concrete.

Hereinafter, description will be given of a concrete example of multicast communication according to the present embodiment.

Figure 7:
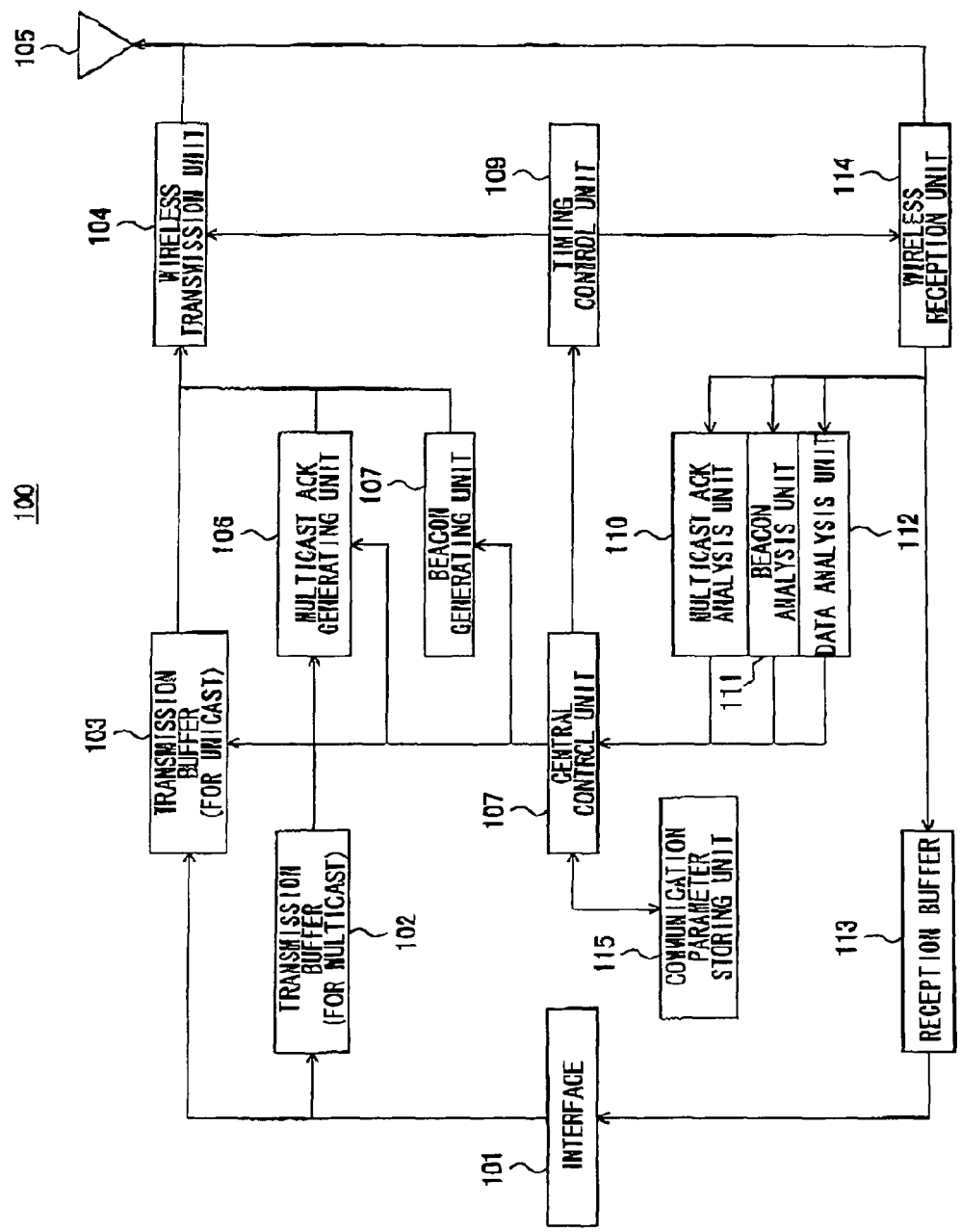
FIG. 7 is a block diagram showing an example of configuration of a wireless communication unit in each of the stations (communication terminals) used in the communication system according to the present embodiment.

FIG. 7 is a block diagram showing an example of configuration of a wireless communication unit in each of the stations (communication terminals) used in the communication system according to the present embodiment.

Note that the wireless communication unit of FIG. 7 is configured so as to be capable of both unicast and multicast communications.

The wireless communication unit 100 of FIG. 7 has an interface 101, a multicast transmission buffer 102, a unicast transmission buffer 103, a wireless transmission unit 104, an antenna 105, a multicast ACK generating unit 106, a beacon generating unit 107, a central control unit 108, a timing control unit 109, a multicast ACK analysis unit 110, a beacon analysis unit 111, a data analysis unit 112, a reception buffer 113, a wireless reception unit 114, and a communication parameter storing unit 115.

The interface 101 exchanges various types of information with not-shown application units and the like connected to this wireless communication unit 100, and with the transmission buffers 102 and 103 and the reception buffer 113.

The transmission buffer 102 temporarily stores multicast data transferred from the connected application units and the like for the sake of wireless transmission.

The transmission buffer 103 temporarily stores unicast data transferred from the connected application units and the like for the sake of wireless transmission.

The wireless transmission unit 104 is intended for the wireless transmission of the data stored in the transmission buffer 103, an ACK signal generated by the multicast ACK generating unit 106, a beacon signal BCN generated by the beacon generating unit 107, and/or the unicast data temporarily stored in the transmission buffer 103. The wireless transmission unit 104 applies predetermined modulation processing to the signals, and emits the resultant to the transmission medium (into the air) through the antenna 105 at timing designated by the timing control unit 109.

The antenna 105 transmits the signals from the wireless transmission unit 104 toward the other stations (wireless communication terminal devices) by air. The antenna 105 also collects signals transmitted from the other stations (wireless communication terminal devices) and supplies them to the wireless reception unit 114.

When a packet is received from another station in multicast communication, the multicast ACK generating unit 106 generates multicast ACK under the control of the central control unit 108. The generated multicast ACK is then supplied to the wireless transmission unit 104 as a multicast packet (NULL+ACK), or along with the data stored in the transmission buffer 102 as (DATA+ACK). Herein, "NULL" of (NULL+ACK) packet indicates that there is no data in the data field DTFLD shown in FIG. 5.

The multicast ACK generating unit 106 performs such processing as sets the ACK bits shown in FIG. 5.

The beacon generating unit 107 generates the beacon signal BCN which indicates the state of allocation of reception slots and the like.

The central control unit 108 exercises sequence control on data communication over the entire unit, and scans available reception slots.

The central control unit 108 has an ACK return timer. When the transmission buffer 102 has any data to transmit, the central control unit 108 determines whether or not a return of ACK information is required on that data. Only if the return of ACK information is required, the central control unit 108 activates the ACK return timer and controls the multicast ACK generating unit 106, the beacon generating unit 107, and the transmission buffer 103 in preparation of receiving packets containing ACK information from the destinations.

The central control unit 108 exercises network switching on that station based on the communication parameters stored in the communication parameter storing unit 115 to be described later. The central control unit 108 exercises communication control in accordance with a communication parameter pertaining to a network. The central control unit 108 is capable of responding to a communication parameter, different from a communication parameter which is being used in communication in progress, included in a packet received by the wireless reception unit 114.

The communication parameter storing unit 115 has a first table and a second table. For example, while holding communication using the first table, the central control unit 108 switches to communication using the second table.

The central control unit 108 also detects the transmission timing of an arbitrary station (communication terminal) on the network, and controls the transmission buffer 103, the beacon generating unit 107, the timing control unit 109, and the like so that a frame can be transmitted by using the same transmission timing.

The central control unit 108 controls the timing control unit 109 and others so that transmission is performed at timing an arbitrary number of slots longer than a maximum value in a list of transmission timings detected from all networks holding communication in an arbitrary channel.

The central control unit 108 controls the timing control unit 109, and by extension the wireless reception unit 114 and others, so as to make reception time longer than usual. The purpose of this is so that information within the network can be updated at the time of an arbitrary beacon number out of those of the communication terminals, which transmit beacon frames having cyclic beacon numbers at a constant frequency, and the frames transmitted from the communication terminals are received. Moreover, the central control unit 108 controls the wireless transmission unit 104 to transmit a beacon signal including information within the network different from information of the transmitted beacon signal at the time of the arbitrary beacon number.

When information of the received beacon in an interval is changed, the central control unit 108 exercises control so that transmission and reception using the communication parameter pertaining to the information of the received beacon can be made in subsequent intervals. In other words, when the beacon information is changed, the central control unit 108 controls the components so that transmission and reception reflecting the beacon information can be made by using the tables of the communication parameter storing unit 115 after that beacon interval.

Under the control of the central control unit 108, the timing control unit 109 gives timing specifications to the wireless transmission unit 104 and the wireless reception unit 114. The timing specifications include those of scan operations and those of reception and transmission operations in predetermined slots.

The multicast ACK analysis unit 110 analyzes whether or not multicast ACK information transmitted from the other stations is received by the wireless reception unit 114. The analysis result is output to the central control unit 108.

The beacon analysis unit 111 analyses beacon signals BCN from the other stations (for example, a game coordinator), received by the wireless reception unit 114, for the timing and the positions of reception slots. The analysis result is output to the central control unit 108.

The data analysis unit 112 analyzes packets from the other stations, received by the wireless reception unit 114, and outputs the analysis result to the central control unit 108.

The reception buffer 113 stores the data that is received at the timing of the reception slots determined by this wireless communication unit 100.

The wireless reception unit 114 receives signals, such as beacon packets and data packets including data and/or ACK information, that are transmitted from the other wireless communication units, at predetermined timing designated by the timing control unit 109. The received signals are supplied to the multicast ACK analysis unit 110, the beacon analysis unit 111, the data analysis unit 112, and the reception buffer 113.

The communication parameter storing unit 115 stores the communication parameters (a to j) mentioned above, and is accessed by the central control unit 108. The communication parameter storing unit 115 has a plurality of tables such as a first table and a second table. Under the control of the central control unit 108, each station conducts communication by using the communication parameters in either one of the tables. Then, when a change occurs in the condition within the network, communication is continued by using the communication parameters in either one of the first and second tables in use while the other table is rewritten with new communication parameters that reflect the change in the network condition.

Suppose, for example, that one of the first and second tables is used for communication when the condition within the network changes due to such reasons as mid-game join or mid-game exit of a station. In this case, the communication using the one table is continued while the other table is prepared for new communication parameters that reflect the change in the network condition. Then, network reconfiguration and communication switching can be performed seamlessly by switching to the other table at certain timing.

The wireless communication unit 100 having the foregoing configuration has the capability of detecting disappearance of a coordinator from the network by lack of reception of beacons and frames from the other terminals, and, if its transmission timing at a certain TBTT is the fastest within the network, serving as a new coordinator itself to transmit beacons.

The wireless communication unit 100 also serves as a communication-holding coordinator having entered a predetermined mode, and has the capability of transmitting a change request frame to a communication terminal to which changeover of the coordinator function is requested, thereby transferring the coordinator function to the communication terminal not having the coordinator function. That is, when the wireless communication unit 100 functions as a coordinator and has entered a predetermined mode, the wireless communication unit 100 transmits a change request frame to another communication terminal device which is not functioning as a coordinator and requested to changeover a coordinator function. The wireless communication unit 100 transfers the coordinator function to another communication terminal device.

Moreover, the wireless communication unit 100 has the capability of accepting transfer of the coordinator function and transmitting beacons, thereby taking over the coordinator function, in response to the change request frame for requesting the changeover of the coordinator function from another communication terminal. That is, the wireless communication unit 100 accepts transfer of the coordinator function and takes over the coordinator function to transmit beacons, in response to a change request frame for requesting the changeover of the coordinator function from another communication terminal device.

Furthermore, the wireless communication unit 100 has the capability of synchronizing beacon transmission with transmission order values.

To realize the foregoing capabilities, the wireless communication unit 100 includes: the wireless transmission and reception units 104 and 114 which perform modulation and demodulation processing; and the central control unit 108, the timing control unit 109, and the communication parameter storing unit 115 which control these.

Hereinafter, description will be given of the procedure for network switching. The description will deal with the case where the game coordinator GC and the other communication terminals (stations) nGC within the network, holding communication using the above communication parameters as the first table of the communication parameter storing unit 115, newly switch to communication using the second table.

<For Mid-Game Join, Mid-Game Exit, and Changeover of the Coordinator Function>

1) A communication terminal nGC which wishes to join mid-game, exit mid-game, or take over the coordinator function transmits a request frame to the game coordinator GC by using a unicast frame.

2) Based on the request result, the game coordinator GC sets communication parameters into the second table of its communication parameter storing unit 115.

3) The game coordinator GC keeps communicating by using the communication parameters in the first table of the communication parameter storing unit 115. In the meantime, the game coordinator GC transmits a packet including the communication parameters of the second table to the communication terminals nGC (including a communication terminal "join nGC" which wishes to join mid-game) by unicast communications.

4) The other communication terminals nGC (including "join nGC") store the communication parameters included in the received packet into the second tables of their communication parameter storing units 115.

5) The other communication terminals nGC (including "join nGC") keep communicating by using the communication parameters of the first table while waiting for the beacon information to be updated by the game coordinator GC.

6) The game coordinator GC updates the beacon information based on the communication parameters in the second table at the timing of a predetermined beacon number.

7) The other communication terminals nGC (including "join nGC") detect the update of the beacon information, and start communicating in accordance with the communication parameters in their own second tables.

8) The entire network shifts to communication under the communication parameters of the second table.

Next, description will be given of the procedure for detecting disappearance of the other communication terminal nGC.

<For Detecting Disappearance of nGC>

1) The other communication terminal nGC disappears from the network without notifying the game coordinator GC.

2) The game coordinator GC detects the disappearance of this other communication terminal nGC by the lack of reception of its multicast frame.

3) When the number of times of detection exceeds a certain threshold, the game coordinator GC transmits such unicast frames as a Null frame to this other communication terminal nGC.

4) When the game coordinator GC recognizes that this other communication terminal nGC returns no ACK response more than a certain number of times, it sets new communication parameters excluding the missing communication terminal nGC into the second table of its communication parameter storing unit 115.

5) The game coordinator GC keeps communicating by using the communication parameters of the first table while unicasting a packet including the communication parameters of the second table to the non-game coordinators nGC.

6) The non-game coordinators nGC store the received communication parameters into the second tables of their communication parameter storing units 115.

7) The non-game coordinators nGC keep communicating by using the communication parameters of the first table while waiting for the beacon information to be updated by the game coordinator GC.

8) The game coordinator GC updates the beacon information based on the communication parameters in the second table at the timing of a predetermined beacon number.

9) The non-game coordinators nGC detect the update of the beacon information, and start communicating in accordance with the communication parameters in their own second tables.

10) The entire network shifts to communication under the communication parameters of the second table.

Next, description will be given of the procedure for detecting disappearance of the game coordinator GC.

<For Detecting Disappearance of GC>

1) The game coordinator GC disappears from the network without notifying the other communication terminals nGC.

2) All the communication terminals nGC within the network detect the disappearance of the game coordinator GC by the lack of reception of the beacon signal and the lack of reception of multicast frames from the other communication terminals nGC.

3) When the number of times of detection exceeds a certain threshold, all the communication terminals nGC within the network set new communication parameters excluding the missing game coordinator GC into their own second tables. Here, the station numbers (device numbers) in the second tables are inherited from the first tables.

4) All the communication terminals nGC within the network maintain the communication parameters of the first tables and wait for beacon transmission by the other communication terminals nGC. In the meantime, they make preparation to transmit beacon information based on the communication parameters in their own second tables at the timing of a predetermined beacon number.

5) Any one of the communication terminals nGC transmits the beacon information based on its second table when its transmission order value is the smallest at the time of a predetermined beacon number. In other words, this communication terminal nGC starts to serve as a new game coordinator GC.

6) When the MAC address of the sender of the beacon information received coincides with any of "the MAC addresses of the stations" contained in the first tables, the other communication terminals nGC extract the multicast address, the MAC address of the game coordinator GC, or the identifier for identifying the game coordinator GC, from the communication parameters in the beacon information received. The other communication terminals nGC then update the second tables of their own communication parameter storing units 115 and perform communication by using the second tables.

7) The game coordinator GC keeps communicating by using the communication parameters of the second table while setting new station numbers (device numbers) into a third table (or first table). The rest of the communication parameters are inherited from the second table.

8) The game coordinator GC keeps communicating by using the communication parameters of the second table while unicasting a packet including the communication parameters of the third (or first) table to the communication terminals nGC.

9) The communication terminals nGC store the received communication parameters into the third (or first) tables of their own communication parameter storing units.

10) The communication terminals nGC keep communicating by using the communication parameters of the second table while waiting for the beacon information to be updated by the game coordinator GC.

11) The game coordinator GC updates the beacon information based on the communication parameters in the third (or first) table at the timing of a predetermined beacon number.

12) The communication terminals nGC detect the update of the beacon information, and start communicating in accordance with the communication parameters in their own third (or first) tables.

13) The entire network shifts to communication under the communication parameters of the third (or first) table.

As described above, the communication system 1 according to the present embodiment as a whole has the following three functions:

Mid-game join to a network while existing terminals are in data communication;

Mid-game exit/disappearance from a network when existing terminals are in data communication; and Changeover of the coordinator function while existing terminals are in data communication.

Hereinafter, the functions for mid-game join, mid-game exit/disappearance, and the changeover of the coordinator function will be described in the concrete.

(Mid-Game Join)

With reference to FIGS. 8A to 8E and FIGS. 9A to 9D, description will initially be given of the mid-game join function. Incidentally, in FIGS. 9A to 9D, the communication based on the communication parameters of the first table and that based on the communication parameters of the second table mentioned above are shown separately.

1) The game coordinator GC shown in FIGS. 8A and 8C (referring to 1 and 3 in FIGS. 8A and 8C) grasps the functions of the non-game coordinators nGC (referring to 2 and 4 in FIGS. 8B and 8D) in the ad-hoc network in advance, and determines if they are capable of the mid-game join function.

2) Having entered a predetermined mode, the game coordinator GC drives the beacon generating unit 107, the timing control unit 109, and the like under the control of the central control unit 108. The game coordinator GC thereby notifies of information indicating whether or not mid-game join, mid-game exit/disappearance, and the changeover of the coordinator function are available in the network, by means of a beacon frame through the wireless transmission unit 104.

3) A communication terminal which wishes to join mid-game (referring to 5 in FIG. 8E; hereinafter, referred to as "join nGC") scans for network information while in an ad-hoc state. If the communication terminal "join nGC" makes active scans, it obtains the network information from probe responses. If passive scans, it obtains the network information from beacon frames.

4) The communication terminal "join nGC" which wishes to join mid-game enters a mid-game join mode internally (see the operation of "join nGC" in FIG. 9D).

5) The communication terminal "join nGC" which wishes to join mid-game transmits a frame for requesting mid-game join to the game coordinator GC at timing (timing E in FIG. 8E) one slot longer than the maximum value of transmission order values acquired from all networks that make transmissions in the same channel.

6) The game coordinator GC maintains the reception time longer than usual (equivalent to delaying the time before entering the power saving state) only when at a certain beacon number (for example, zero), in order to receive the mid-game join request frame from the communication terminal "join nGC" which wishes to join mid-game. Then, the game coordinator GC returns an ACK frame in response to the mid-game join request frame received.

7) The game coordinator GC inserts it into a frame and thereby notifies the other communication terminals nGC that one communication terminal nGC will be added to the network, that a communication scheme to be used thereafter is selected, and so on.

8) Based on the result of the foregoing step (7), the game coordinator GC notifies the communication terminal "join nGC" which wishes to join mid-game whether or not it is eventually possible to join mid-game.

9) After the notification of the result at step (8), the game coordinator GC updates the beacon information (including the total number of terminals in the network) at the timing of a certain beacon number. (for example, zero).

10) The existing communication terminals nGC receive the beacon information updated, and update their internal information such as the total number of terminals and the transmission order values.

11) Simultaneously with the beacon update at step (9), the communication terminal "join nGC" which wishes to join mid-game becomes a normal communication terminal nGC and starts communicating with the other terminals.

There are another method and case as to the transmission timing of the communication terminal "join nGC" which wishes to join mid-game. This method will now be described with reference to FIGS. 10A to 10E and FIGS. 11A to 11D. Incidentally, in FIGS. 11A to 11D, the communication based on the communication parameters of the first table and that based on the communication parameters of the second table mentioned above are shown separately.

1) The game coordinator GC (referring to 1 and 3 in FIGS. 10A and 10C) grasps the functions of the communication terminals nGC (referring to 2 and 4 in FIGS. 10B and 10D) in the ad-hoc network in advance, and determines whether or not they are capable of the mid-game join function.

2) Having entered a predetermined mode, the game coordinator GC drives the beacon generating unit 107, the timing control unit 109, and the like under the control of the central control unit 108. The game coordinator GC thereby notifies of information indicating whether or not mid-game join, mid-game exit/disappearance, and the changeover of the coordinator function are available in the network, by means of a beacon frame through the wireless transmission unit 104.

3) A communication terminal "join nGC" which wishes to join mid-game (referring to 5 in FIG. 10E) scans for network information while in an ad-hoc state. If the communication terminal join nGC performs active scans, it obtains the network information from probe responses. If passive scans, it obtains the network information from beacon frames.

4) The communication terminal "join nGC" which wishes to join mid-game enters a mid-game join mode internally (see FIG. 11D).

5) After an arbitrary one of the communication terminals in the network to which the communication terminal "join nGC" wishes to join transmits a multicast frame, the communication terminal "join nGC" transmits a unicast frame for requesting mid-game join to the game coordinator GC. Here, the unicast frame is transmitted by using the IFS timing to be used by the arbitrary one (timing A in FIG. 10A). Note that the arbitrary communication terminal shall not be one that has the maximum transmission order value in this TBTT.

6) The game coordinator GC receives the mid-game join request frame from the communication terminal "join nGC" which wishes to join mid-game. The game coordinator GC returns an ACK frame in response.

7) The game coordinator GC inserts it into a frame and thereby notifies the other communication terminals nGC that one communication terminal nGC will be added to the network, that a communication scheme to be used thereafter is selected, and so on.

8) Based on the result of step (7), the game coordinator GC notifies the communication terminal "join nGC" which wishes to join mid-game whether or not it is eventually possible to join mid-game.

9) After the notification of the result at step (8), the game coordinator GC updates the beacon information (including the total number of terminals in the network) at the timing of a certain beacon number (for example, zero).

10) The existing communication terminals nGC receive the beacon information updated, and update their internal information such as the total number of terminals and the transmission order values.

11) Simultaneously with the beacon update at step (9), the communication terminal "join nGC" which wishes to join mid-game becomes a normal communication terminal nGC and starts communicating with the other terminals.

(Mid-Game Exit/Disappearance)

Next, description will be given of mid-game exit/disappearance.

Initially, the sequence for exit will be described with reference to FIGS. 12A to 12C.

<Exit>

1) A communication terminal that is to exit from the network (hereinafter, referred to as "Exit nGC") transmits a frame for requesting mid-game exit to the game coordinator GC (the terminal 3 in FIG. 12C).

2) The game coordinator GC returns ACK in response.

3) The game coordinator GC updates the beacon information at the timing of a certain beacon number (for example, zero) since the total number of terminals becomes N−1.

4) The communication terminal "Exit nGC" exiting from the network stops its own transmission at the point in time when the beacon information is updated at step (3), and thereby exits from the network in the predetermined mode.

5) The existing communication terminals nGC receive the beacon information updated, update their internal information such as the total number of terminals and the transmission order values, and continue communication.

<Disappearance of GC from the Network>

Now, with reference to FIGS. 13A to 13C, description will be given of the processing for situations where GC becomes invisible (disappears) from the network due to such reasons as moving out of the coverage and power-off. Incidentally, in FIGS. 13A to 13C, the communication based on the communication parameters of the first table (or third table) and that based on the communication parameters of the second table mentioned is above are shown separately.

1) Having entered a predetermined mode, the communication terminals nGC receive the beacon transmitted from the game coordinator GC, and store it into their internal databases.

2) The game coordinator GC disappears from the network due to power-off or the like, whereby beacon transmission is stopped.

3) When the communication terminals nGC individually detect the beacon disappearance and receive no data from any of the other communication terminals within the network, they determine that the disappearance of GC is detected.

4) The processing for "detecting the disappearance of GC" is performed by every target beacon transmission time (TBTT). If the number of times of detection in succession exceeds a certain threshold, a communication terminal nGC that has the minimum transmission order value substitutes for the coordinator and starts beacon transmission at the timing of a certain beacon number to come next (for example, zero). As a result, that communication terminal nGC is regarded as a new game coordinator GC (New GC).

5) The GC detects the number of times it does not receive any data from the non-game coordinators nGC in the network TBTT by TBTT. When the number of times of detection in succession exceeds a certain threshold, the GC stops beacon transmission and exits from the network.

6) The beacon frames to be transmitted each include the MAC address of the new game coordinator New GC as the source address, and the number of communication terminals given by "the number of terminals before GC disappearance−1."

7) The communication terminals nGC have a table containing the addresses of the communication terminals nGC within the network in advance. The communication terminals nGC thus receive beacons as before if the beacons are transmitted any one of the terminals.

8) Whereas communication is interrupted for a certain period ((disappearance detection threshold)+15)×beacon interval [ms]), it is resumed by the beacon transmission by the new game coordinator New GC.

<Disappearance of nGC from the Network>

Next, with reference to FIGS. 14A to 14C, description will be given of the processing for situations where communication terminals nGC become invisible (disappear) from the network due to such reasons as moving out of the coverage and power-off. Incidentally, in FIGS. 14A to 14C, the communication based on the communication parameters of the first table and that based on the communication parameters of the second table mentioned above are shown separately.

1) The network shall contain N communication terminals in communication.

2) Communication from one communication terminal nGC stops without notification to the game coordinator GC, and the game coordinator GC detects disappearance of a multicast frame.

3) The game coordinator GC detects that the total number of multicast frames from the other communication terminals nGC as changed from N−1 to N−2. When this state lasts for a predetermined period (exceeding a threshold), normal data such as a certain number of Null frames in succession is transmitted to a communication terminal nGC that seems to have disappeared from the network.

4) Here, if there is no ACK returned from this communication terminal nGC, the game coordinator GC detects "the disappearance of the nGC from the network," and updates the beacon information at the timing of an arbitrary beacon number (for example, zero).

5) The existing communication terminals nGC receive the beacon information updated, update their internal information such as the total number of terminals and the transmission order values, and continue communication.

(Changeover of the Coordinator Function)

Next, the procedure for changing over the coordinator function will be described with reference to FIGS. 15A to 15D.

1) The game coordinator GC grasps the functions of the communication terminals nGC in the ad-hoc network in advance, and determines whether or not it is possible to change over the coordinator function.

2) Having entered a predetermined mode, the game coordinator GC notifies of the information that indicates whether or not mid-game join, mid-game exit/disappearance, and the changeover of the coordinator function are available, by means of a beacon frame.

3) Having entered a predetermined mode, the communication terminals nGC receive the beacon transmitted from the game coordinator GC, and store the information into their internal databases.

4) The game coordinator GC transmits a frame for notifying of the changeover of the coordinator function to a particular communication terminal nGC.

5) The communication terminal nGC that receives the notification of the changeover returns the determination as to whether or not it can substitute for to the game coordinator GC.

6) The communication terminal nGC available for changeover (hereinafter, referred to as New GC) transmits the following information to the other communication terminals nGC in the network:

A) the MAC address of the new game coordinator New GC; and

B) the multicast address of the new network.

7) The new game coordinator New GC terminates the communication with all the communication terminals nGC within the network.

8) The new game coordinator New GC notifies the old coordinator Old GC of the timing of changeover.

9) It comes to the timing of changeover (an arbitrary TBTT determined by negotiation).

10) As soon as beacons from the old game coordinator Old GC stop, the new game coordinator New GC starts to transmit beacons.

11) The old game coordinator Old GC becomes an ordinary communication terminal nGC. As a result, the new game coordinator New GC establishes communication seamlessly without causing a period in which no beacon is transmitted.

(Synchronization Between the Order of Transmission of Beacons and Transmission Order Values)

According to the protocol of the present embodiment, the beacon sender may be fixed to the game coordinator GC, whereas the sender may be changed in synchronization with the transmission order values. FIGS. 16A to 16D show the mechanism.

1) The communication terminal having the smallest transmission order value in a certain TBTT transmits a beacon frame.

2) The beacon numbers are in consecutive order within the network, not incremented terminal by terminal.

3) Consequently, the GC function is changed over (in a round-robin fashion) along with the transmission order value.

As has been described, according to the present embodiment, the wireless communication unit 100 in each of the communication terminals can detect disappearance of the coordinator from the network by the lack of reception of beacons and frames from the other terminals. Each communication terminal can serve as a new coordinator itself and transmit beacons if its transmission timing in a certain TBTT is the shortest within the network. Each communication terminal also has the following capabilities of: serving as a communication-holding coordinator having entered a predetermined mode, and transmitting a change request frame to a communication terminal to which changeover of the coordinator function is requested, thereby transferring the coordinator function to the communication terminal not functioning as the coordinator; accepting transfer of the coordinator function and transmitting beacons, thereby taking over the coordinator function, in response to the change request frame for requesting the changeover of the coordinator function from another communication terminal; and synchronizing the transmission of the beacons with the transmission order values. As a result, the following effects are obtained.

(Mid-Game Join)

New communication terminals can join the existing network in a predetermined mode without interrupting communication of the network.

For example, when a plurality of users are playing a beat-'em-up game, new users can make entry without stopping the game temporarily.

(Mid-Game Exit/Disappearance)

Communication terminals can exit from the existing network without interrupting the communication of the network. The coordinator can also update the beacon information to optimize the power consumption of the remaining terminals.

For example, when a plurality of uses are playing a beat-'em-up game, one of the users can exit from the game in the middle.

Moreover, even when communication terminals disappear from the network, the coordinator can reconstruct the network information by checking communication periodically. This optimizes the power saving of the remaining terminals.

Even if the coordinator disappears from the network, it is possible to provide a substitute coordinator. The existing communication can thus be restored with a slight communication loss alone.

For example, even in such cases that the game host runs out of batteries, it is possible to continue the game by the existing users alone without terminating the game.

(Changeover of the Coordinator Function)

The coordinator is in charge of beacon transmission and thus consumes higher power as compared to the other communication terminals. The high power consumption, however, can be distributed within the network for uniform power consumptions.

Moreover, when the coordinator falls in the remaining battery level and is at risk for disappearance, this function can also be used to change over the coordinator without interrupting the communication.

For example, users who are playing a game can switch the game host or organizer seamlessly.

(Synchronization Between the Order of Transmission of Beacons and Transmission Order Values)

In existing ad-hoc networks, beacon transmission is performed by utilizing random backoff time. With that protocol, beacon transmission can be conducted by the game coordinator GC alone, whereas it may be synchronized with the transmission order values for clearer order of transmission. If the beacon transmission is associated with the presence or absence of multicast transmission, it is possible to clarify radio-wave conditions, physical relationship, and the like in case of missing frames. This improves such controls as power control and rate control.

Up to this point, the present invention has been described in conjunction with the embodiment thereof. This embodiment is given solely by way of illustration. It will be understood by those skilled in the art that various modifications may be made to combinations of the foregoing components and processes, and all such modifications are also intended to fall within the scope of the present invention.

The foregoing embodiment has dealt chiefly with the case where small latency is required and the multicast communication of type 3 is carried out. Nevertheless, the present invention may be not only used for power saving control for situations where small latency is required, but also used effectively for other cases, including when the communication schemes of type 1 and type 2 are employed.

Incidentally, the processing described above is recorded as a computer-processable program on a floppy disk, hard disk, optical disk, semiconductor memory, or the like. The program, is read and executed by the terminal devices.

What is claimed is:

1. A communication terminal device for forming a group with at least one other communication terminal device and performing communication within the group, the communication terminal device comprising:
   a transmission unit which transmits at least an annunciation signal and/or a packet including a communication parameter to the at least one other communication terminal device;
   a reception unit which receives at least an annunciation signal and/or a packet including a communication parameter from the at least one other communication terminal device; and
   a control unit which exercises communication control in accordance with a communication parameter pertaining to a network, the control unit responding to a communication parameter, different from a communication parameter which is being used in communication in progress, included in a packet received by the reception unit, wherein
   the control unit makes a determination as to joining and exiting in the middle of the communication within the group and changing over a function as a coordinator which transmits the annunciation signal, based on at least the communication parameter, and
   the communication terminal device accepts transfer of the coordinator function and takes over the coordinator function to transmit the annunciation signal, in response to a change request frame for requesting the changeover of the coordinator function from another communication terminal device.

2. The communication terminal device according to claim 1, functioning as a coordinator within the group on the network, wherein:
   when the communication terminal device detects disappearance of a coordinator within the network by lack of reception of the annunciation signal and a frame from the at least one other communication terminal device and when its transmission timing at the time of transmission of a predetermined target annunciation signal is the fastest within the network, the communication terminal device serves as a new coordinator itself to transmit the annunciation signal.

3. The communication terminal device according to claim 1, wherein:
   when the communication terminal device functions as a coordinator and has entered a predetermined mode, the communication terminal device transmits a change request frame to another communication terminal device which is not functioning as a coordinator and requested to changeover a coordinator function, and transfers the coordinator function to another communication terminal device.

4. The communication terminal device according to claim 1, wherein:
   the control unit detects the transmission timing of the at least one other communication terminal device from a signal received from the other communication terminal device, and controls the transmission unit to make a transmission by using the timing detected.

5. The communication terminal device according to claim 4, wherein:
   the control unit exercises control so that the transmission can be made at timing a predetermined number of slots longer than a maximum value in a list of transmission timings detected from all networks holding communication in an arbitrary channel.

6. The communication terminal device according to claim 4, having a capability of synchronizing the transmission of the annunciation signal with a transmission order value.

7. The communication terminal device according to claim 1, wherein:
   the transmission unit transmits annunciation signals having predetermined cyclic annunciation signal numbers at a constant frequency; and
   the control unit controls the transmission unit to transmit an annunciation signal including information within the network different from information of the transmitted annunciation signal at the time of an arbitrary annunciation signal number.

8. The communication terminal device according to claim 7, wherein:
   the control unit exercises control to make reception time longer than usual so that the frame transmitted by the at least one other communication terminal device can be received.

9. The communication terminal device according to claim 1, wherein:
   when information of the received annunciation signal in an interval is changed, the control unit exercises control so that transmission and reception using a communication parameter pertaining to the information of the received annunciation signal can be made in subsequent intervals.

10. The communication terminal device according to claim 1, further comprising:
    a storing unit which stores a communication parameter used for transmitting and receiving packets, wherein:
    when the reception unit receives a communication parameter different from the communication parameter in use, the control unit records the received communication parameter to the storing unit, and
    when the reception unit receives an annunciation signal including information within the network different from information of the transmitted annunciation signal, the control unit exercises control so that the transmission and reception is made by using the communication parameter newly recorded to the storing unit.

11. A communication system comprising a plurality of communication terminal devices for forming a group and performing communication within the group,
    the communication terminal devices each including:
    a transmission unit which transmits at least an annunciation signal and/or a packet including a communication parameter to the at least one other communication terminal device;
    a reception unit which receives at least an annunciation signal and/or a packet including a communication parameter from the at least one other communication terminal device; and
    a control unit which exercises communication control in accordance with a communication parameter pertaining to a network, the control unit responding to a communication parameter, different from a communication parameter which is being used in communication in progress, included in a packet received by the reception unit, wherein the control unit makes a determination as to joining and exiting in the middle of the communication within the group and changing over a function as a coordinator which transmits the annunciation signal, based on at least the communication parameter, and the communication terminal device accepts transfer of the coordinator function and takes over the coordinator function to transmit the annunciation signal, in response to a change request frame for requesting the changeover of the coordinator function from another communication terminal device.

12. The communication system according to claim 11, wherein:

the transmission unit transmits annunciation signals having predetermined cyclic annunciation signal numbers at a constant frequency; and the control unit controls the transmission unit to transmit an annunciation signal including information within the network different from information of the transmitted annunciation signal at the time of an arbitrary annunciation signal number.

13. The communication terminal system according to claim 12, wherein:

the control unit exercises control to make reception time longer than usual so that the frame transmitted by the at least one other communication terminal device can be received.

14. The communication system according to claim 11, wherein:

when information of the received annunciation signal in an interval is changed, the control unit exercises control so that transmission and reception using a communication parameter pertaining to the information of the received annunciation signal can be made in subsequent intervals.

15. The communication system according to claim 14, the communication terminal devices each including:

a storing unit which stores a communication parameter used for transmitting and receiving packets, wherein:

when the reception unit receives a communication parameter different from the communication parameter in use, the control unit records the received communication parameter to the storing unit, and when the reception unit receives an annunciation signal including information within the network different from information of the transmitted annunciation signal, the control unit exercises control so that the transmission and reception is made by using the communication parameter newly recorded to the storing unit.

16. The communication system according to claim 11, wherein:

when information of the annunciation signal is updated, each of the communication terminal devices changes a communication parameter in use into a communication parameter pertaining to the updated information in the annunciation signal at certain timing.

17. A communication method for use in a communication terminal device for forming a group with at least one other communication terminal device and performing communication within the group, the method comprising:

transmitting at least an annunciation signal and/or a packet including a communication parameter to the at least one other communication terminal device;

receiving at least an annunciation signal and/or a packet including a communication parameter from the at least one other communication terminal device;

exercising communication control in accordance with a communication parameter pertaining to a network;

responding to a communication parameter, different from a communication parameter which is being used in communication in progress, included in a packet received, thereby exercising communication control in accordance with a communication parameter;

making a determination as to joining and exiting in the middle of the communication within the group and changing over a function as a coordinator which transmits the annunciation signal, based on at least the communication parameter; and accepting, by the communication terminal device, transfer of the coordinator function and taking over the coordinator function to transmit the annunciation signal, in response to a change request frame for requesting the changeover of the coordinator function from another communication terminal device.

18. A non-transitory computer-readable recording medium having a program stored therein so that a communication terminal executes processing for forming a group with at least one other communication terminal device and performing wireless communication within the group, the program comprising:

transmitting at least an annunciation signal and/or a packet including a communication parameter to the at least one other communication terminal device;

receiving at least an annunciation signal and/or a packet including a communication parameter from the at least one other communication terminal device;

exercising communication control in accordance with a communication parameter pertaining to a network;

responding to a communication parameter, different from a communication parameter which is being used in communication in progress, included in a packet received, thereby exercising communication control in accordance with a communication parameter;

making a determination as to joining and exiting in the middle of the communication within the group and changing over a function as a coordinator which transmits the annunciation signal, based on at least the communication parameter; and accepting, by the communication terminal device, transfer of the coordinator function and taking over the coordinator function to transmit the annunciation signal, in response to a change request frame for requesting the changeover of the coordinator function from another communication terminal device.

* * * * *